United States Patent
Fang et al.

(10) Patent No.: US 9,350,996 B2
(45) Date of Patent: *May 24, 2016

(54) METHOD AND APPARATUS FOR LAST COEFFICIENT INDEXING FOR HIGH EFFICIENCY VIDEO CODING

(71) Applicant: Google Technology Holdings LLC, Mountain View, CA (US)

(72) Inventors: Xue Fang, San Diego, CA (US); Wei-Ying Kung, San Diego, CA (US); Limin Wang, San Diego, CA (US)

(73) Assignee: GOOGLE TECHNOLOGY HOLDINGS LLC, Mountain View, CA (US)

(*) Notice: Subject to any disclaimer, the term of this patent is extended or adjusted under 35 U.S.C. 154(b) by 500 days.

This patent is subject to a terminal disclaimer.

(21) Appl. No.: 13/722,625

(22) Filed: Dec. 20, 2012

(65) Prior Publication Data

US 2013/0215969 A1 Aug. 22, 2013

Related U.S. Application Data

(60) Provisional application No. 61/577,898, filed on Dec. 20, 2011.

(51) Int. Cl.
*H04N 7/26* (2006.01)
*H04N 7/30* (2006.01)
(Continued)

(52) U.S. Cl.
CPC ....... *H04N 19/00775* (2013.01); *H04N 19/132* (2014.11); *H04N 19/136* (2014.11); *H04N 19/18* (2014.11); *H04N 19/463* (2014.11); *H04N 19/70* (2014.11); *H04N 19/91* (2014.11); *H04N 19/46* (2014.11)

(58) Field of Classification Search
CPC ............... H04N 19/70; H04N 19/463; H04N 19/00775; H04N 19/132; H04N 19/18; H04N 19/91; H04N 19/46
USPC .......................................... 348/49
See application file for complete search history.

(56) References Cited

U.S. PATENT DOCUMENTS 5,500,678 A 3/1996 Puri
5,570,203 A 10/1996 Suzuki et al.
(Continued)

FOREIGN PATENT DOCUMENTS

WO WO2011128303 10/2011

OTHER PUBLICATIONS

Sze et al., "CE11: Parallelization of HHI_Transform_Coding (Fixed Diagonal Scan from C227)," JCTVC-F129, Jul. 2011.
(Continued)

*Primary Examiner* — Hee-Yong Kim
(74) *Attorney, Agent, or Firm* — Young Basile Hanlon & MacFarlane P.C.

(57) ABSTRACT

A method, apparatus, article of manufacture, and a memory structure for encoding and decoding transform unit coefficients is disclosed. In one embodiment, the encoding of the transform unit coefficients is performed by determining if all of the coefficients of a portion of the transform unit disposed on a portion of a scan pattern are zero, setting a flag associated with the portion of the transform unit to a first value if at least one of the coefficients of the portion of the transform unit coefficients disposed on the portion of the scan pattern are non-zero, and setting the flag associated with the portion of the transform unit coefficients to a second value if all of the coefficients of the portion of the transform unit coefficients disposed in the portion of the scan pattern are zero.

26 Claims, 25 Drawing Sheets

(51) Int. Cl.
| | |
|---|---|
| H04N 7/50 | (2006.01) |
| H04N 19/60 | (2014.01) |
| H04N 19/70 | (2014.01) |
| H04N 19/463 | (2014.01) |
| H04N 19/91 | (2014.01) |
| H04N 19/132 | (2014.01) |
| H04N 19/136 | (2014.01) |
| H04N 19/18 | (2014.01) |
| H04N 19/46 | (2014.01) |

(56) References Cited

U.S. PATENT DOCUMENTS

| | | | |
|---|---|---|---|
| 6,061,474 | A | 5/2000 | Kajiwara et al. |
| 2002/0191694 | A1 | 12/2002 | Ohyama et al. |
| 2004/0066974 | A1 | 4/2004 | Karczewicz et al. |
| 2007/0172153 | A1 | 7/2007 | Song |
| 2009/0046941 | A1 | 2/2009 | Mietens et al. |
| 2010/0150253 | A1 | 6/2010 | Kuo et al. |
| 2012/0033731 | A1 | 2/2012 | Yamamoto et al. |
| 2012/0044990 | A1 | 2/2012 | Bivolarsky et al. |
| 2012/0163473 | A1 | 6/2012 | Laroche et al. |
| 2013/0003824 | A1 | 1/2013 | Guo et al. |
| 2013/0003834 | A1* | 1/2013 | Rojals et al. ............. 375/240.12 |
| 2013/0028329 | A1 | 1/2013 | Lou et al. |
| 2013/0083856 | A1 | 4/2013 | Sole Rojals et al. |
| 2013/0215970 | A1 | 8/2013 | Fang et al. |
| 2013/0235932 | A1 | 9/2013 | Srinivasan et al. |
| 2013/0343454 | A1 | 12/2013 | Yeo et al. |

OTHER PUBLICATIONS

Auyeung (Sony) C. et al., "CE11: Hardware complexity of large zig zag scan for level-coding of transformcoefficients," JCT-VC Meeting; MPEG Meeting; Torino, IT, Jul. 14-22, 2011.
Auyeung (Sony)C., "Cross Checking of JCTVC-C227 and proposal on semantic, syntax and implementation," JCT-VC Meeting; MPEG Meeting; Torino, IT, Jul. 14-22, 2011.
Bross B et al.: "WD4: Working Draft 4 of High-Efficiency Video Coding", 6. JCT-VC Meeting; 97, MPEG Meeting; Jul. 14, 2011-Jul. 22, 2011; Torino; (Joint Collaborative Team on Video Coding of ISO/IEC JTC1/SC29/WG11 and ITU-T SG. 16); URL:http://wftp3.itu.int/av-arch/jctvc-site/, No. JCTVC-F803, Sep. 8, 2011, all pages.
Cao (Tsinghua) X et al., "CE6. Report on Short Distance Intra Prediction Method," JCT-VC Meeting; Geneva, Mar. 2011.
Guo et al., "Non-Square Transform for 2NxN and Nx2N Motion Partitions," 6th Meeting: Torino, JVTC-F563, Jul. 14-22, 2011.
ISR & Written Opinion, Re: Application #PCT/US2012/047888; Nov. 28, 2012.
ISR, & Written Opinion of the International Searching Authority for International Application No. PCT/US2012/071046 Mailed Jun. 24, 2014.
Nguyen N et al.: "Multi-level Significant Maps for Large Transform Units", 7. JCT-VC Meeting; 98, MPEG Meeting; Nov. 21, 2011-Nov. 30, 2011; Geneva; (Joint Collaborative Team on Video Coding of ISO/IEC JTC1/SC29/WG11 and ITU-T SG.16); URL:http://wftp3.itu.int/av-arch/jctvc-site/, No. JCTVC-G644, Nov. 9, 2011, all pages.
Yuan, et al., "CE2: Non-Square Quadtree Transform for symmetricand asymmetric motion partitions," JCTVC-F410, 6th Meeting: Torino, IT, Jul. 14-22, 2011.
Sole, et al., Parallel Context Processing for the significance map in high coding efficiency. Joel Sole, JCTVC_D262, ver 1, 2011-01016.
Sole et al., "CE11: Parallel Context Processing for the Significance Map in High Coding Efficiency," 5th Meeting: Geneva, CH, Mar. 16-23, 2011.
Sole, et al., "CE11: Unified Scans for the Significance map and coefficient level coding in high efficiency," JCT-VC Meeting—MPEG Meeting: Torino, IT, Jul. 14-22, 2011.
Sullivan et al., "Video Compression—from concepts to the H.264/AVC Standard," Proceedings of the IEEE, vol. 93, No. 1, Jan. 2005.
Sullivan G J et al., "Meeting report of the sixth meeting of the joint Collaborative Team on Video Coding (JCT-VC)"; JCT-VC Meeting; MPEG Meeting; Torino, IT, Jul. 14-22, 2011. (Part 1).
Sullivan G J et al., "Meeting report of the sixth meeting of the joint Collaborative Team on Video Coding (JCT-VC)"; JCT-VC Meeting; MPEG Meeting; Torino, IT, Jul. 14-22, 2011. (Part 2).
Sullivan G J et al., "Meeting report of the sixth meeting of the joint Collaborative Team on Video Coding (JCT-VC)"; JCT-VC Meeting; MPEG Meeting; Torino, IT, Jul. 14-22, 2011. (Part 3).
Sze V et al., "Parallelization of HHI_Transform_Coding 9 (Fixed Diagonal Scan From C277)," 6th Meeting; Torino, IT, Jul. 14-22, 2011.
Sze V et al., "Parallelization of HHI_Transform_Coding," JCT-VC Meeting; MPEG Meeting Guangzhou, Oct. 2010.
Winken (Fraunhofer HHI) M. et al., "Video Coding Technology Proposal by Fraunhoffer HHI", 1. JCT-VC Meeting Apr. 15, 2010-Apr. 23, 2010; Dresden; (Joint Collaborative Team on Video Coding of IS/IEC JTC1/SC29/WG11 and ITU-T SG.16); URL:http://wftp3.itu.int/av-arch/jctvc-site/, No. 24 Apr. 2010, all pages.
Bankoski et al. "Technical Overview of VP8, an Open Source Video Codec for the Web". Dated Jul. 11, 2011.
Bankoski et al. "VP8 Data Format and Decoding Guide" Independent Submission. RFC 6389, Dated Nov. 2011.
Bankoski et al. "VP8 Data Format and Decoding Guide; draft-bankoski-vp8-bitstream-02" Network Working Group. Internet-Draft, May 18, 2011, 288 pp.
Implementors' Guide; Series H: Audiovisual and Multimedia Systems; Coding of moving video: Implementors Guide for H.264: Advanced video coding for generic audiovisual services. H.264. International Telecommunication Union. Version 12. Dated Jul. 30, 2010.
Overview; VP7 Data Format and Decoder. Version 1.5. On2 Technologies, Inc. Dated Mar. 28, 2005.
Series H: Audiovisual and Multimedia Systems; Infrastructure of audiovisual services—Coding of moving video. H.264. Advanced video coding for generic audiovisual services. International Telecommunication Union. Version 11. Dated Mar. 2009.
Series H: Audiovisual and Multimedia Systems; Infrastructure of audiovisual services—Coding of moving video. H.264. Advanced video coding for generic audiovisual services. International Telecommunication Union. Version 12. Dated Mar. 2010.
Series H: Audiovisual and Multimedia Systems; Infrastructure of audiovisual services—Coding of moving video. H.264. Amendment 2: New profiles for professional applications. International Telecommunication Union. Dated Apr. 2007.
Series H: Audiovisual and Multimedia Systems; Infrastructure of audiovisual services—Coding of moving video. H.264. Advanced video coding for generic audiovisual services. Version 8. International Telecommunication Union. Dated Nov. 1, 2007.
Series H: Audiovisual and Multimedia Systems; Infrastructure of audiovisual services—Coding of moving video; Advanced video coding for generic audiovisual services. H.264. Amendment 1: Support of additional colour spaces and removal of the High 4:4:4 Profile. International Telecommunication Union. Dated Jun. 2006.
Series H: Audiovisual and Multimedia Systems; Infrastructure of audiovisual services—Coding of moving video; Advanced video coding for generic audiovisual services. H.264. Version 1. International Telecommunication Union. Dated May 2003.
Series H: Audiovisual and Multimedia Systems; Infrastructure of audiovisual services—Coding of moving video; Advanced video coding for generic audiovisual services. H.264. Version 3. International Telecommunication Union. Dated Mar. 2005.
U.S. Appl. No. 61/503,726, filed Jul. 1, 2011, entitled "Non-square transform blocks in video coding."
VP6 Bitstream & Decoder Specification. Version 1.02. On2 Technologies, Inc. Dated Aug. 17, 2006.
VP6 Bitstream & Decoder Specification. Version 1.03. On2 Technologies, Inc. Dated Oct. 29, 2007.
VP8 Data Format and Decoding Guide. WebM Project. Google On2. Dated: Dec. 1, 2010.

* cited by examiner

|   |   |   |   |   |   |   |   |
|---|---|---|---|---|---|---|---|
| 5 | 0 | 0 | 0 | 0 | 1 | 0 | 0 |
| 0 | 3 | 0 | 0 | 0 | 0 | 0 | 0 |
| 0 | 0 | 0 | 0 | 0 | 0 | 0 | 0 |
| 2 | 0 | 0 | 0 | 0 | 0 | 0 | 0 |
| 0 | 0 | 0 | 0 | 0 | 0 | 0 | 0 |
| 1 | 0 | 0 | 0 | 0 | 1 | 0 | 0 |
| 0 | 0 | 0 | 0 | 0 | 0 | 0 | 0 |
| 0 | 0 | 0 | 0 | 0 | 0 | 0 | 0 |

*FIG. 14A*

|   |   |   |   |   |   |   |   |
|---|---|---|---|---|---|---|---|
| 1 | 0 | 0 | 0 | 0 | 1 | 0 | 0 |
| 0 | 1 | 0 | 0 | 0 | 0 | 0 | 0 |
| 0 | 0 | 0 | 0 | 0 | 0 | 0 | 0 |
| 1 | 0 | 0 | 0 | 0 | 0 | 0 | 0 |
| 0 | 0 | 0 | 0 | 0 | 0 | 0 | 0 |
| 1 | 0 | 0 | 0 | 0 | 1 | 0 | 0 |
| 0 | 0 | 0 | 0 | 0 | 0 | 0 | 0 |
| 0 | 0 | 0 | 0 | 0 | 0 | 0 | 0 |

| Initialisation variables | | 0 | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|---|
| last_significant_coefficient_x and last_significant_coeff_y ctxIdx | | | | | | | | | | | | | | | | |
| | m | 14 | 10 | 12 | 22 | 10 | 9 | 17 | 15 | 16 | 17 | 18 | 16 | 23 | 20 | 24 |
| | n | 25 | 38 | 41 | 25 | 37 | 40 | 19 | 21 | 18 | 16 | 13 | 18 | -2 | -2 | -9 |
| | m | 15 | 16 | 17 | 18 | 19 | 20 | 21 | 22 | 23 | 24 | 25 | 26 | 27 | 28 | 29 |
| | n | 24 | 18 | 9 | 22 | 37 | 35 | 53 | 31 | 13 | 21 | 35 | 22 | 18 | 9 | 14 |
| | m | -7 | 10 | 24 | -7 | 9 | 14 | -5 | 21 | 39 | 28 | 2 | 17 | 23 | 40 | 32 |
| | n | 30 | 31 | 32 | 33 | 34 | 35 | 36 | 37 | 38 | 39 | 40 | 41 | 42 | 43 | 44 |
| | m | 7 | 12 | 12 | 13 | 21 | 24 | 23 | 13 | 22 | 29 | 29 | 27 | 20 | 25 | 30 |
| | n | 44 | 35 | 40 | 47 | 16 | 10 | 15 | 34 | 10 | 10 | -8 | -5 | 7 | 13 | -8 |
| | m | 45 | 46 | 47 | 48 | 49 | 50 | 51 | 52 | 53 | 54 | 55 | 56 | 57 | 58 | 59 |
| | n | 35 | 37 | 42 | 42 | 43 | 21 | 22 | 35 | 11 | 22 | 27 | -3 | 14 | 23 | 27 |
| | m | -20 | -29 | -41 | -45 | -46 | 36 | 37 | 27 | 53 | 27 | 18 | 83 | 35 | 18 | 3 |
| | n | 60 | 61 | 62 | 63 | 64 | 65 | 66 | 67 | 68 | 69 | 70 | 71 | 72 | 73 | 74 |
| | m | 32 | 17 | 12 | 12 | 13 | 21 | 24 | 23 | 13 | 22 | 29 | 29 | 27 | 20 | 25 |
| | n | -11 | 11 | 35 | 40 | 47 | 16 | 10 | 15 | 34 | 10 | 10 | -8 | -5 | 7 | 13 |
| | m | 75 | 76 | 77 | 78 | 79 | 80 | 81 | 82 | 83 | 84 | 85 | 86 | 87 | 88 | 89 |
| | n | 30 | 35 | 37 | 42 | 42 | 43 | 21 | 22 | 35 | 11 | 22 | 27 | -3 | 14 | 23 |
| | m | -8 | -20 | -29 | -41 | -45 | -46 | 36 | 37 | 27 | 53 | 27 | 18 | 83 | 35 | 18 |
| | n | 90 | 91 | 92 | 93 | 94 | 95 | 96 | 97 | 98 | 99 | 100 | 101 | 102 | 103 | 104 |
| | m | 27 | 32 | 17 | | | | | | | | | | | | |
| | n | 3 | -11 | 11 | | | | | | | | | | | | |

FIG. 15B

| Type | MaxBinIdxCtx | ctxIdxOffset |
|---|---|---|
| | last_significant_coeff_x last_significant_coeff_y | |
| I | 30 | 0 |
| P | 30 | 31 |
| B | 30 | 62 |

FIG. 18A

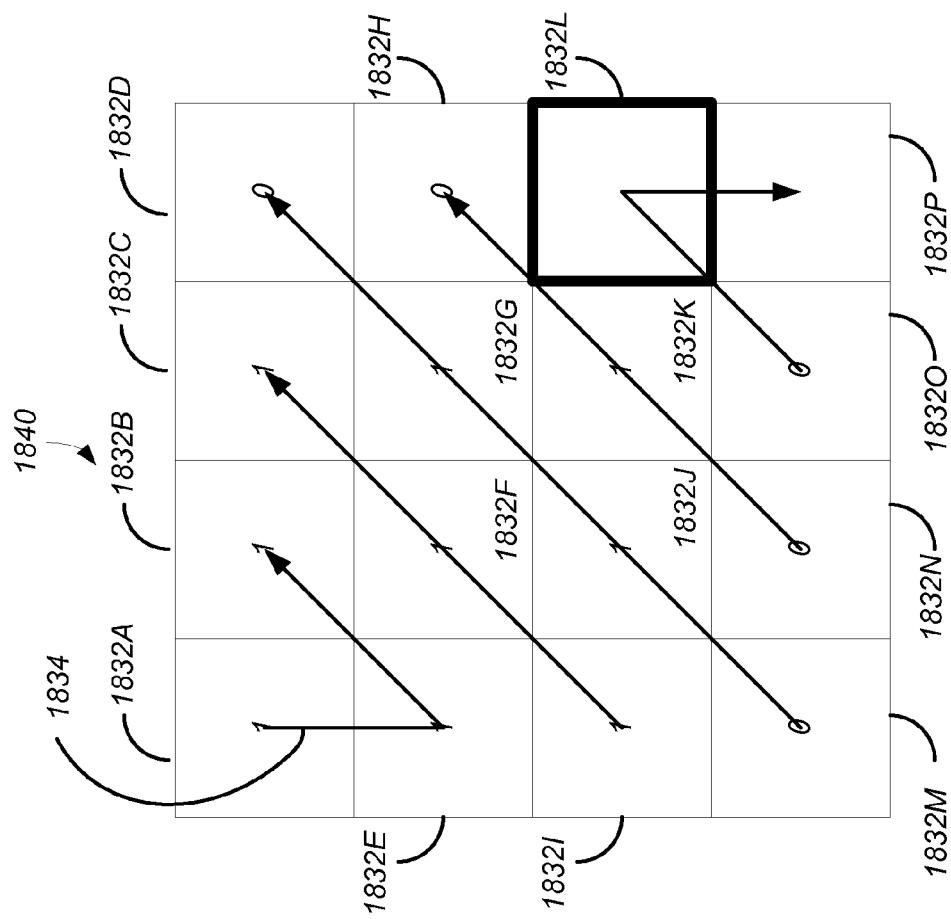

1850A

| 0 | 0 |   | 0 |
|---|---|---|---|
|   | 1 |   |   |
| 1 |   | 0 |   |
| 4 | 4 |   |   |

1820A

| 1 | 1 | 0 | 1 |
|---|---|---|---|
| 0 | 1 | 0 | 0 |
| 1 | 0 | 1 | 0 |
| 1 | 1 | 0 | 0 |

1832A

| 1 | 1 | 0 | 1 |
|---|---|---|---|
| 0 | 2 | 0 | 0 |
| 2 | 0 | 1 | 0 |
| 5 | 5 | 0 | 0 |

FIG. 18G

METHOD AND APPARATUS FOR LAST COEFFICIENT INDEXING FOR HIGH EFFICIENCY VIDEO CODING

CROSS-REFERENCE TO RELATED APPLICATIONS

This application claims benefit of U.S. Provisional Patent Application No. 61/577,898, entitled "LAST COEFFICIENT GROUP POSITION CODING IN HEVC," by Xue Fang, Krit Panusopone, and Limin Wang, filed Dec. 20, 2011, which application is also hereby incorporated by reference herein.

This application is related to U.S. Utility patent application Ser. No. 13/722,702, entitled "METHOD AND APPARATUS FOR LAST COEFFICIENT GROUP POSITION CODING," by Xue Fang, Krit Panusopone, and Limin Wang, filed on Dec. 20, 2012 which is hereby incorporated by reference herein.

BACKGROUND OF THE INVENTION

1. Field of the Invention

The present invention relates to systems and methods for encoding data, and in particular to a system and method for storing motion and retrieving data associated with high efficiency video coded data.

2. Description of the Related Art

There is rapid growth in the technologies associated with the generation, transmission, and reproduction of media programs. These technologies include coding schemes that permit digital versions of the media programs to be encoded to compress them to much smaller size and facilitate their transmission, storage, reception and playback. These technologies have application in personal video recorders (PVRs), video on demand (VOD), multiple channel media program offerings, interactivity, mobile telephony, and media program transmission.

Without compression, digital media programs are typically too large to transmit and/or store for a commercially acceptable cost. However, compression of such programs has made the transmission and storage of such digital media programs not only commercially feasible, but commonplace.

Initially, the transmission of media programs involved low to medium resolution images transmitted over high bandwidth transmission media such as cable television and satellite. However, such transmission has evolved to include lower bandwidth transmission media such as Internet transmission to fixed and mobile devices via computer networks, WiFi, Mobile TV and third and fourth generation (3G and 4G) networks. Further, such transmissions have also evolved to include high definition media programs such as high definition television (HDTV), which have significant transmission bandwidth and storage requirements.

The encoding and decoding of compressed video signals typically involves the storage and retrieval of large volumes of data by both the encoder of the signals and the decoder of the signals. As a consequence, such encoders and decoders require increased storage and processing capacity. What is needed is a system and method that reduces the storage and processing required in the encoder and decoder. The present invention satisfies this need.

SUMMARY OF THE INVENTION

To address the requirements described above, this document discloses a method, apparatus, article of manufacture, and a memory structure for processing a transform unit having an array of coefficients is disclosed. One embodiment is evidenced by a method comprising determining if all of the coefficients of a portion of the transform unit disposed on a portion of a scan pattern are zero, setting a flag associated with the portion of the transform unit to a first value if at least one of the coefficients of the portion of the transform unit coefficients disposed on the portion of the scan pattern are non-zero, and setting the flag associated with the portion of the transform unit coefficients to a second value if all of the coefficients of the portion of the transform unit coefficients disposed in the portion of the scan pattern are zero.

Another embodiment is manifested by an apparatus comprising a processor and a memory coupled to the processor, storing instructions for performing steps comprising the operations listed above.

The features, functions, and advantages that have been discussed can be achieved independently in various embodiments of the present invention or may be combined in yet other embodiments further details of which can be seen with reference to the following description and drawings.

BRIEF DESCRIPTION OF THE DRAWINGS

Referring now to the drawings in which like reference numbers represent corresponding parts throughout:

FIG. 14A is an diagram of an exemplary transform unit coefficient map;

FIG. 14B is a diagram of an exemplary significance map of the transform unit of FIG. 14A;

FIG. 15A presents a table for determining the initialization variables in an entropy encoder;

FIG. 15B presents a table showing the an offset for different coding unit type;

FIG. 18A is a diagram of 16×16 transform unit;

FIG. 18F is a diagram of an alternative L1 significance map showing encoded subblock values;

FIG. 18G is a diagram illustrating the coding of the transform coefficients within an exemplary subblock;

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Audio-Visual Information Transception and Storage

Figure 1:
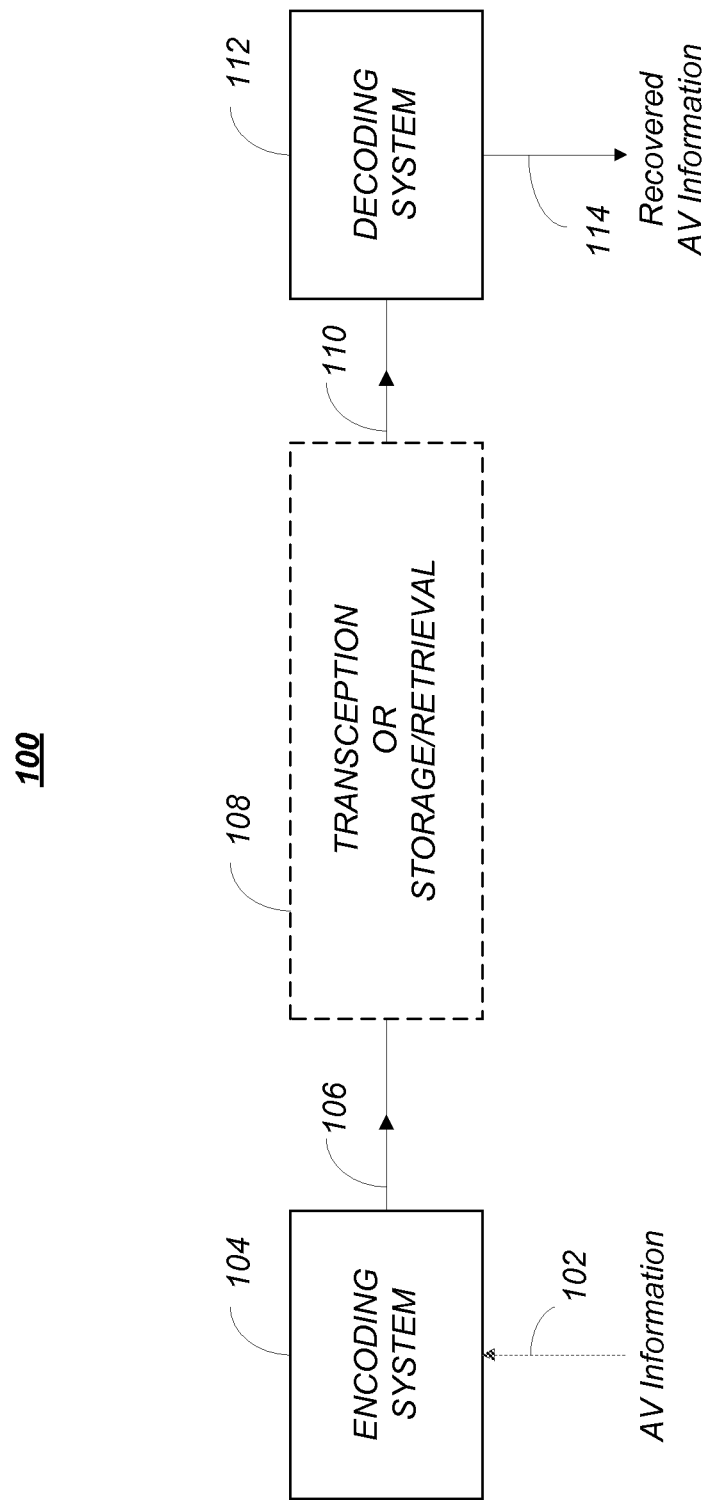
FIG. 1 is a diagram depicting an exemplary embodiment of a video coding-decoding system that can be used for transmission and/or storage and retrieval of audio and/or video information.

FIG. 1 is a diagram depicting an exemplary embodiment of a video coding-decoding (codec) system 100 that can be used for transmission and/or storage and retrieval of audio and/or video information. The codec system 100 comprises an encoding system 104, which accepts audio-visual (AV) information 102 and processes the AV information 102 to generate encoded (compressed) AV information 106, and a decoding system 112, which processes the encoded AV information 106 to produce recovered AV information 114. Since the encoding and decoding processes are not lossless, the recovered AV information 114 is not identical to the initial AV information 102, but with judicious selection of the encoding processes and parameters, the differences between the recovered AV information 114 and the unprocessed AV information 102 are acceptable to human perception.

The encoded AV information 106 is typically transmitted or stored and retrieved before decoding and presentation, as performed by transception (transmission and reception) or storage/retrieval system 108. Transception losses may be significant, but storage/retrieval losses are typically minimal or non-existent, hence, the transcepted AV information 110 provided to the decoding system 112 is typically the same as or substantially the same as the encoded AV information 106.

Figure 2A:
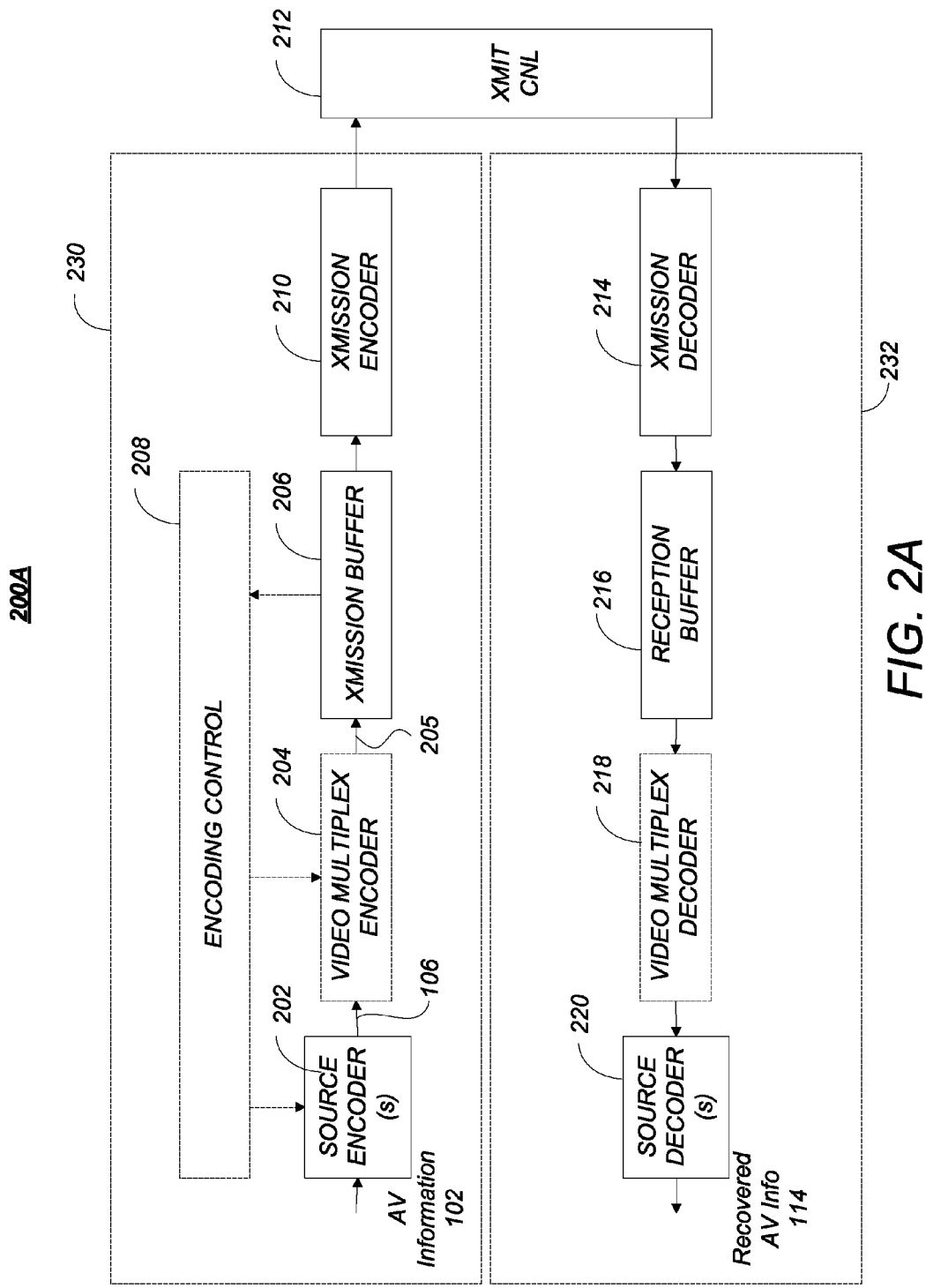
FIG. 2A is a diagram of one embodiment of a codec system 200A in which the encoded AV information is transmitted to and received at another location.

FIG. 2A is a diagram of one embodiment of a codec system 200A in which the encoded AV information 106 is transmitted to and received at another location. A transmission segment 230 converts an input AV information 102 into a signal appropriate for transmission and transmits the converted signal over the transmission channel 212 to the reception segment 232. The reception segment 232 receives the transmitted signal, and converts the received signal into the recovered AV information 114 for presentation. As described above, due to coding and transmission losses and errors, the recovered AV information 114 may be of lower quality than the AV information 102 that was provided to the transmission segment 230. However, error correcting systems may be included to reduce or eliminate such errors. For example, the encoded AV information 106 may be forward error correction (FEC) encoded by adding redundant information, and such redundant information can be used to identify and eliminate errors in the reception segment 230.

The transmission segment 102 comprises one or more source encoders 202 to encode multiple sources of AV information 102. The source encoder 202 encodes the AV information 102 primarily for purposes of compression to produce the encoded AV information 106, and may include, for example a processor and related memory storing instructions implementing a codec such as MPEG-1, MPEG-2, MPEG-4 AVC/H.264, HEVC or similar codec, as described further below.

The codec system 200A may also include optional elements indicated by the dashed lines in FIG. 2A. These optional elements include a video multiplex encoder 204, an encoding controller 208, and a video demultiplexing decoder 218. The optional video multiplex encoder 204 multiplexes encoded AV information 106 from an associated plurality of source encoder(s) 202 according to one or more parameters supplied by the optional encoding controller 208. Such multiplexing is typically accomplished in the time domain and is data packet based.

In one embodiment, the video multiplex encoder 204 comprises a statistical multiplexer, which combines the encoded AV information 106 from a plurality of source encoders 202 so as to minimize the bandwidth required for transmission. This is possible, since the instantaneous bit rate of the coded AV information 106 from each source encoder 202 can vary greatly with time according to the content of the AV information 102. For example, scenes having a great deal of detail and motion (e.g. sporting events) are typically encoded at higher bitrates than scenes with little motion or detail (e.g. portrait dialog). Since each source encoder 202 may produce information with a high instantaneous bit rate while another source encoder 202 produces information with a low instantaneous bit rate, and since the encoding controller 208 can command the source encoders 202 to encode the AV information 106 according to certain performance parameters that affect the instantaneous bit rate, the signals from each of the source encoders 106 (each having a temporally varying instantaneous bit rate) can be combined together in an optimal way to minimize the instantaneous bit rate of the multiplexed stream 205.

As described above, the source encoder 202 and the video multiplex coder 204 may optionally be controlled by a coding controller 208 to minimize the instantaneous bit rate of the combined video signal. In one embodiment, this is accomplished using information from a transmission buffer 206 which temporarily stores the coded video signal and can indicate the fullness of the buffer 206. This allows the coding performed at the source encoder 202 or video multiplex coder 204 to be a function of the storage remaining in the transmission buffer 206.

The transmission segment 230 also may comprise a transmission encoder 210, which further encodes the video signal for transmission to the reception segment 232. Transmission encoding may include for example, the aforementioned FEC coding and/or coding into a multiplexing scheme for the transmission medium of choice. For example, if the transmission is by satellite or terrestrial transmitters, the transmission encoder 114 may encode the signal into a signal constellation before transmission via quadrature amplitude modulation (QAM) or similar modulation technique. Also, if the encoded video signal is to be streamed via an Internet protocol device and the Internet, the transmission encodes the signal according to the appropriate protocol. Further, if the encoded signal is to be transmitted via mobile telephony, the appropriate coding protocol is used, as further described below.

The reception segment 232 comprises a transmission decoder 214 to receive the signal that was coded by the transmission coder 210 using a decoding scheme complementary to the coding scheme used in the transmission encoder 214. The decoded received signal may be temporarily stored by optional reception buffer 216, and if the received signal comprises multiple video signals, the received signal is multiplex decoded by video multiplex decoder 218 to extract the video signal of interest from the video signals multiplexed by the video multiplex coder 204. Finally, the video signal of interest is decoded by source decoder 220 using a decoding scheme or codec complementary to the codec used by the source encoder 202 to encode the AV information 102.

In one embodiment, the transmitted data comprises a packetized video stream transmitted from a server (representing the transmitting segment 230) to a client (representing the receiving segment 232). In this case, the transmission encoder 210 may packetize the data and embed network abstract layer (NAL) units in network packets. NAL units define a data container that has header and coded elements, and may correspond to a video frame or other slice of video data.

The compressed data to be transmitted may packetized and transmitted via transmission channel 212, which may include a Wide Area Network (WAN) or a Local Area Network (LAN). Such a network may comprise, for example, a wireless network such as Wi-Fi, an Ethernet network, an Internet network or a mixed network composed of several different networks. Such communication may be affected via a communication protocol, for example Real-time Transport Protocol (RTP), User Datagram Protocol (UDP) or any other type of communication protocol. Different packetization methods may be used for each network abstract layer (NAL) unit of the bitstream. In one case, one NAL unit size is smaller than the maximum transport unit (MTU) size corresponding to the largest packet size that can be transmitted over the network without being fragmented. In this case, the NAL unit is embedded into a single network packet. In another case, multiple entire NAL units are included in a single network packet. In a third case, one NAL unit may be too large to be transmitted in a single network packet and is thus split into several fragmented NAL units with each fragmented NAL unit being transmitted in an individual network packet. Fragmented NAL unit are typically sent consecutively for decoding purposes.

The reception segment 232 receives the packetized data and reconstitutes the NAL units from the network packet. For fragmented NAL units, the client concatenates the data from the fragmented NAL units in order to reconstruct the original NAL unit. The client 232 decodes the received and reconstructed data stream and reproduces the video images on a display device and the audio data by a loud speaker.

Figure 2B:
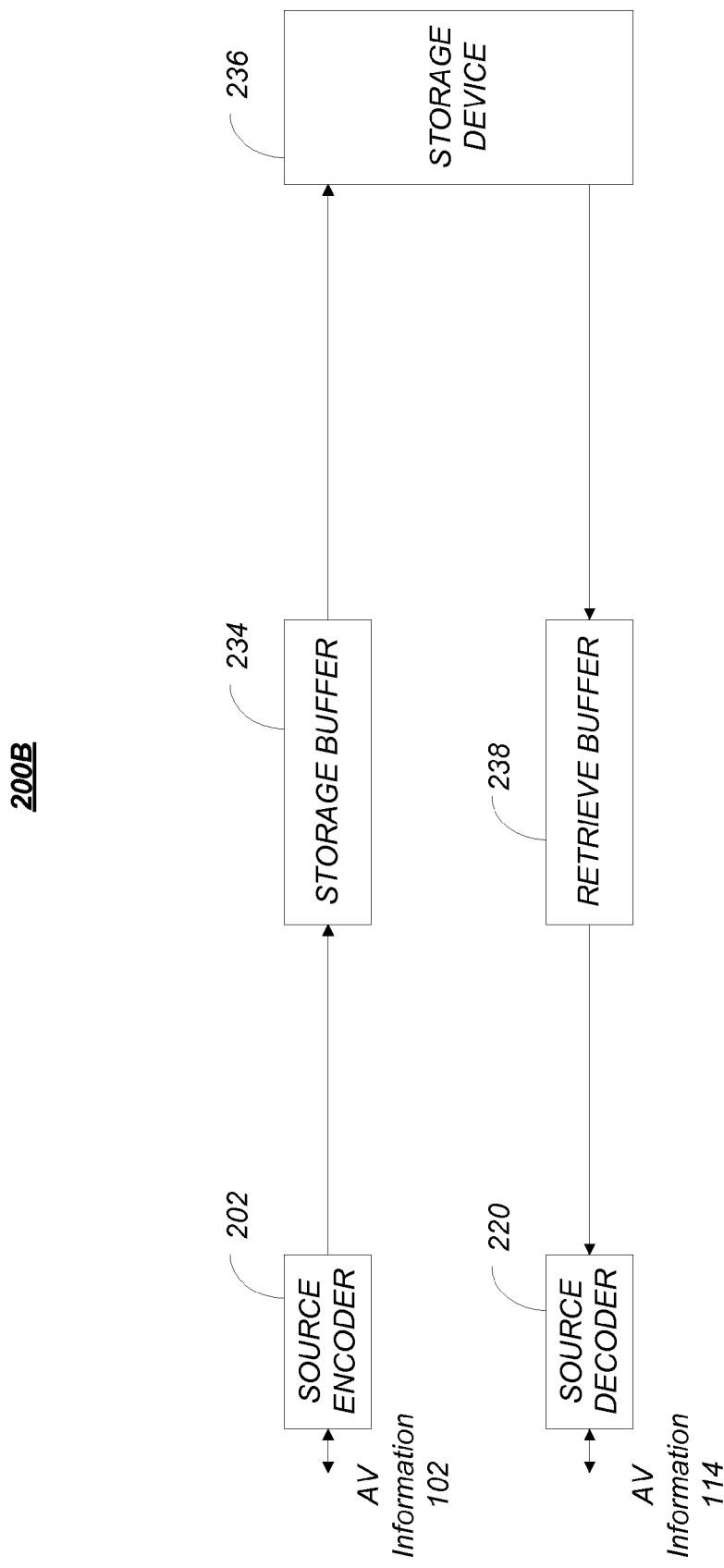
FIG. 2B is a diagram depicting an exemplary embodiment of codec system in which the encoded information is stored and later retrieved for presentation, hereinafter referred to as codec storage system.

FIG. 2B is a diagram depicting an exemplary embodiment of codec system in which the encoded information is stored and later retrieved for presentation, hereinafter referred to as codec storage system 200B. This embodiment may be used, for example, to locally store information in a digital video recorder (DVR), a flash drive, hard drive, or similar device. In this embodiment, the AV information 102 is source encoded by source encoder 202, optionally buffered by storage buffer 234 before storage in a storage device 236. The storage device 236 may store the video signal temporarily or for an extended period of time, and may comprise a hard drive, flash drive, RAM or ROM. The stored AV information is then retrieved, optionally buffered by retrieve buffer 238 and decoded by the source decoder 220.

Figure 2C:
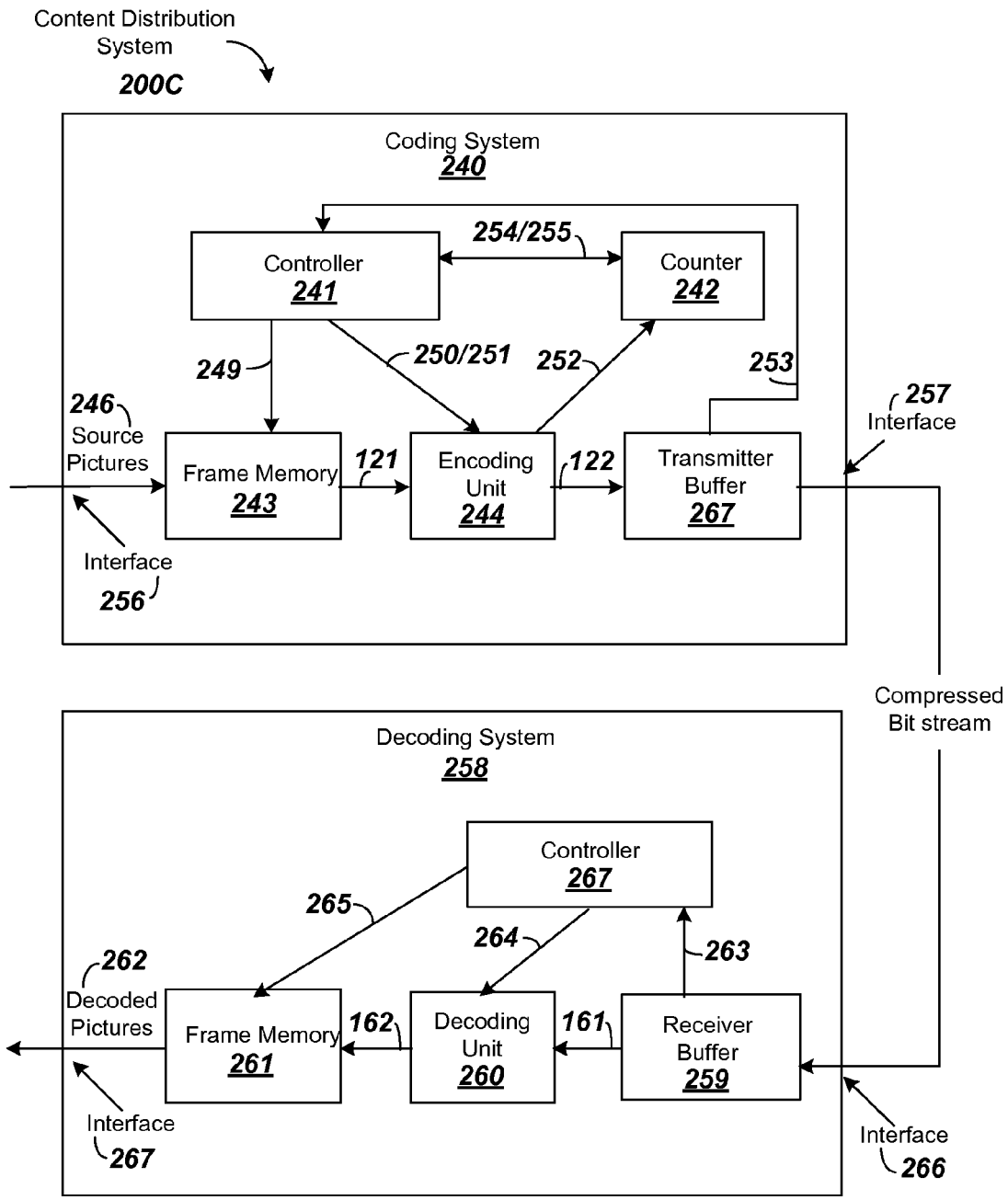
FIG. 2C is a diagram depicting an exemplary content distribution system comprising an encoder and a decoder that can be used to transmit and receive HEVC data.

FIG. 2C is another diagram depicting an exemplary content distribution system 200C comprising a coding system or encoder 202 and a decoding system or decoder 220 that can be used to transmit and receive HEVC data. In some embodiments, the coding system 202 can comprise an input interface 256, a controller 241 a counter 242 a frame memory 243, an encoding unit 244, a transmitter buffer 267 and an output interface 257. The decoding system 220 can comprise a receiver buffer 259, a decoding unit 260, a frame memory 261 and a controller 267. The coding system 202 and the decoding system 220 can be coupled with each other via a transmission path which can carry a compressed bit stream. The controller 241 of the coding system 202 can control the amount of data to be transmitted on the basis of the capacity of the transmitter buffer 267 or receiver buffer 259 and can include other parameters such as the amount of data per a unit of time. The controller 241 can control the encoding unit 244 to prevent the occurrence of a failure of a received signal decoding operation of the decoding system 220. The controller 241 can be a processor or include, by way of a non-limiting example, a microcomputer having a processor, a random access memory and a read only memory.

Source pictures 246 supplied from, by way of a non-limiting example, a content provider can include a video sequence of frames including source pictures in a video sequence. The source pictures 246 can be uncompressed or compressed. If the source pictures 246 are uncompressed, the coding system 202 can have an encoding function. If the source pictures 246 are compressed, the coding system 202 can have a transcoding function. Coding units can be derived from the source pictures utilizing the controller 241. The frame memory 243 can have a first area that can be used for storing the incoming frames from the source pictures 246 and a second area that can be used for reading out the frames and outputting them to the encoding unit 244. The controller 241 can output an area switching control signal 249 to the frame memory 243. The area switching control signal 249 can indicate whether the first area or the second area is to be utilized.

The controller 241 can output an encoding control signal 250 to the encoding unit 244. The encoding control signal 250 can cause the encoding unit 202 to start an encoding operation, such as preparing the Coding Units based on a source picture. In response to the encoding control signal 250 from the controller 241, the encoding unit 244 can begin to read out the prepared Coding Units to a high-efficiency encoding process, such as a prediction coding process or a transform coding process which process the prepared Coding Units generating video compression data based on the source pictures associated with the Coding Units.

The encoding unit 244 can package the generated video compression data in a packetized elementary stream (PES) including video packets. The encoding unit 244 can map the video packets into an encoded video signal 248 using control information and a program time stamp (PTS) and the encoded video signal 248 can be transmitted to the transmitter buffer 267.

The encoded video signal 248, including the generated video compression data, can be stored in the transmitter buffer 267. The information amount counter 242 can be incremented to indicate the total amount of data in the transmitter buffer 267. As data is retrieved and removed from the buffer, the counter 242 can be decremented to reflect the amount of data in the transmitter buffer 267. The occupied area information signal 253 can be transmitted to the counter 242 to indicate whether data from the encoding unit 244 has been added or removed from the transmitter buffer 267 so the counter 242 can be incremented or decremented. The controller 241 can control the production of video packets produced by the encoding unit 244 on the basis of the occupied area information 253 which can be communicated in order to anticipate, avoid, prevent, and/or detect an overflow or underflow from taking place in the transmitter buffer 267.

The information amount counter 242 can be reset in response to a preset signal 254 generated and output by the controller 241. After the information amount counter 242 is reset, it can count data output by the encoding unit 244 and obtain the amount of video compression data and/or video packets which have been generated. The information amount counter 242 can supply the controller 241 with an information amount signal 255 representative of the obtained amount of information. The controller 241 can control the encoding unit 244 so that there is no overflow at the transmitter buffer 267.

In some embodiments, the decoding system 220 can comprise an input interface 266, a receiver buffer 259, a controller 267, a frame memory 261, a decoding unit 260 and an output interface 267. The receiver buffer 259 of the decoding system 220 can temporarily store the compressed bit stream, including the received video compression data and video packets based on the source pictures from the source pictures 246. The decoding system 220 can read the control information and presentation time stamp information associated with video packets in the received data and output a frame number signal 263 which can be applied to the controller 220. The controller 267 can supervise the counted number of frames at a predetermined interval. By way of a non-limiting example, the controller 267 can supervise the counted number of frames each time the decoding unit 260 completes a decoding operation.

In some embodiments, when the frame number signal 263 indicates the receiver buffer 259 is at a predetermined capacity, the controller 267 can output a decoding start signal 264 to the decoding unit 260. When the frame number signal 263 indicates the receiver buffer 259 is at less than a predetermined capacity, the controller 267 can wait for the occurrence of a situation in which the counted number of frames becomes equal to the predetermined amount. The controller 267 can output the decoding start signal 263 when the situation occurs. By way of a non-limiting example, the controller 267 can output the decoding start signal 264 when the frame number signal 263 indicates the receiver buffer 259 is at the predetermined capacity. The encoded video packets and video compression data can be decoded in a monotonic order (i.e., increasing or decreasing) based on presentation time stamps associated with the encoded video packets.

In response to the decoding start signal 264, the decoding unit 260 can decode data amounting to one picture associated with a frame and compressed video data associated with the picture associated with video packets from the receiver buffer 259. The decoding unit 260 can write a decoded video signal 269 into the frame memory 261. The frame memory 261 can have a first area into which the decoded video signal is written, and a second area used for reading out decoded pictures 262 to the output interface 267.

In various embodiments, the coding system 202 can be incorporated or otherwise associated with a transcoder or an encoding apparatus at a headend and the decoding system 220 can be incorporated or otherwise associated with a downstream device, such as a mobile device, a set top box or a transcoder.

Source Encoding/Decoding

As described above, the encoders 202 employ compression algorithms to generate bit streams and/or files of smaller size than the original video sequences in the AV information 102. Such compression is made possible by reducing spatial and temporal redundancies in the original sequences.

Prior art encoders 202 include those compliant with the video compression standard H.264/MPEG-4 AVC ("Advanced Video Coding") developed by between the "Video Coding Expert Group" (VCEG) of the ITU and the "Moving Picture Experts Group" (MPEG) of the ISO, in particular in the form of the publication "Advanced Video Coding for Generic Audiovisual Services" (March 2005), which is hereby incorporated by reference herein.

HEVC "High Efficiency Video Coding" (sometimes known as H.265) is expected to replace the H.264/MPEG-4 AVC. HEVC introduces new coding tools and entities that are generalizations of the coding entities defined in H.264/AVC, as further described below, and as described in U.S. Provisional Application Nos. 61/562,418, 61/619,916, and 61/595,141.

Figure 3:
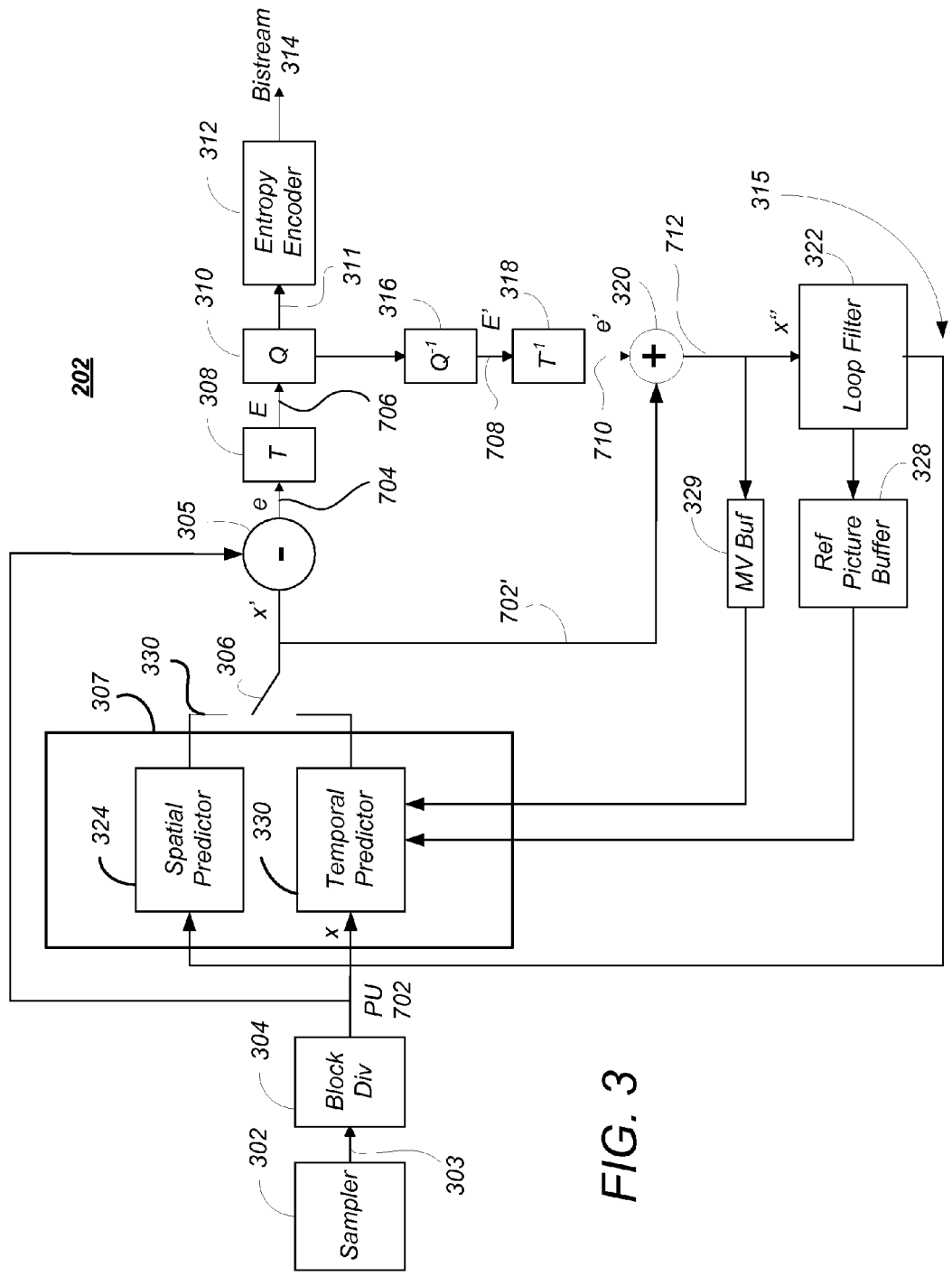
FIG. 3 is a block diagram illustrating one embodiment of the source encoder.

FIG. 3 is a block diagram illustrating one embodiment of the source encoder 202. The source encoder 202 accepts AV information 102 and uses sampler 302 sample the AV information 102 to produce a sequence 303 of successive of digital images or pictures, each having a plurality of pixels. A picture can comprise a frame or a field, wherein a frame is a complete image captured during a known time interval, and a field is the set of odd-numbered or even-numbered scanning lines composing a partial image.

The sampler 302 produces an uncompressed picture sequence 303. Each digital picture can be represented by one or more matrices having a plurality of coefficients that represent information about the pixels that together comprise the picture. The value of a pixel can correspond to luminance or other information. In the case where several components are associated with each pixel (for example red-green-blue components or luminance-chrominance components), each of these components may be separately processed.

Images can be segmented into "slices," which may comprise a portion of the picture or may comprise the entire picture. In the H.264 standard, these slices are divided into coding entities called macroblocks (generally blocks of size 16 pixels×16 pixels) and each macroblock may in turn be divided into different sizes of data blocks 102, for example 4×4, 4×8, 8×4, 8×8, 8×16, 16×8. HEVC expands and generalizes the notion of the coding entity beyond that of the macroblock.

HEVC Coding Entities: CTU, CU, PU and TU

Like other video coding standards, HEVC is a block-based hybrid spatial and temporal predictive coding scheme. However, HEVC introduces new coding entities that are not included with H.264/AVC standard. These coding entities include (1) Coding tree block (CTUs), coding units (CUs), the predictive units (PUs) and transform units (TUs) and are further described below.

Figure 4:
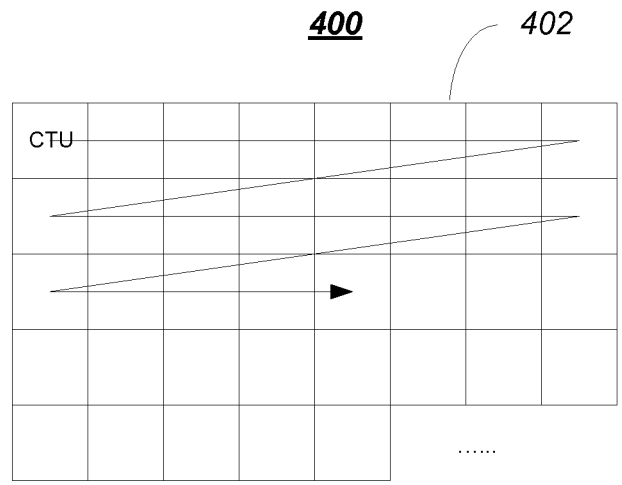
FIG. 4 is a diagram depicting a picture of AV information, such as one of the pictures in the picture sequence.

FIG. 4 is a diagram depicting a picture 400 of AV information 102, such as one of the pictures in the picture sequence 303. The picture 400 is spatially divided into non-overlapping square blocks known as coding tree units(s), or CTUs 402. Unlike H.264 and previous video coding standards where the basic coding unit is macroblock of 16×16 pixels, the CTU 402 is the basic coding unit of HEVC, and can be as large as 128×128 pixels. As shown in FIG. 4, the CTUs 402 are typically referenced within the picture 400 in an order analogous to a progressive scan.

Each CTU 402 may in turn be iteratively divided into smaller variable size coding units described by a "quadtree" decomposition further described below. Coding units are regions formed in the image to which similar encoding parameters are applied and transmitted in the bitstream 314.

Figure 5:
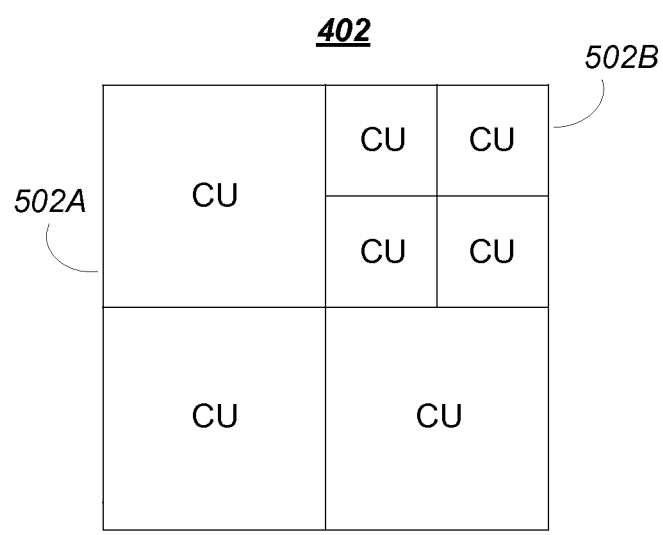
FIG. 5 is a diagram showing an exemplary partition of a coding tree block into coding units.

FIG. 5 is a diagram showing an exemplary partition of a CTU 402 into coding units (CUs) such as coding unit 502A and 502B (hereinafter alternatively referred to as coding unit(s) 502). A single CTU 402 can be divided into four CUs 502 such as CU 502A, each a quarter of the size of CTU 402. Each such divided CU 502A can be further divided into four smaller CUs 502B of quarter size of initial CU 502A.

The division of CTUs 402 into CUs 502A and into smaller CUs 502B is described by "quadtree" data parameters (e.g. flags or bits) that are encoded into the output bitstream 314 along with the encoded data as overhead known as syntax.

Figure 6:
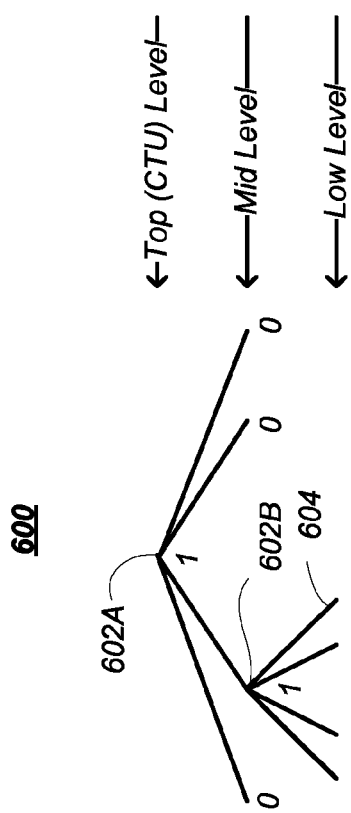
FIG. 6 is a diagram illustrating a representation of a representative quadtree and data parameters for the code tree block partitioning shown in FIG. 5.

FIG. 6 is a diagram illustrating a representation of a representative quadtree 600 and data parameters for the CTU 402 partitioning shown in FIG. 5. The quadtree 600 comprises a plurality of nodes including first node 602A at one hierarchical level and second node 602B at a lower hierarchical level (hereinafter, quadtree nodes may be alternatively referred to as "nodes" 602). At each node 602 of a quadtree, a "split flag" or bit "1" is assigned if the node 602 is further split into sub-nodes, otherwise a bit "0" is assigned.

For example, the CTU 402 partition illustrated in FIG. 5 can be represented by the quadtree 600 presented in FIG. 6, which includes a split flag of "1" associated with node 602A at the top CU 502 level (indicating there are 4 additional nodes at a lower hierarchical level). The illustrated quadtree 600 also includes a split flag of "1" associated with node 602B at the mid CU 502 level to indicate that this CU is also partitioned into four further CUs 502 at the next (bottom) CU level. The source encoder 202 may restrict the minimum and maximum CU 502 sizes, thus changing the maximum possible depth of the CU 502 splitting.

The encoder 202 generates encoded AV information 106 in the form of a bitstream 314 that includes a first portion having encoded data for the CUs 502 and a second portion that includes overhead known as syntax elements. The encoded data includes data corresponding to the encoded CUs 502 (i.e. the encoded residuals together with their associated motion vectors, predictors, or related residuals as described further below). The second portion includes syntax elements that may represent encoding parameters which do not directly correspond to the encoded data of the blocks. For example, the syntax elements may comprise an address and identification of the CU 502 in the image, a quantization parameter, an indication of the elected Inter/Intra coding mode, the quadtree 600 or other information.

CUs 502 correspond to elementary coding elements and include two related sub-units: prediction units (PUs) and transform units (TUs), both of which have a maximum size equal to the size of the corresponding CU 502.

Figure 7:
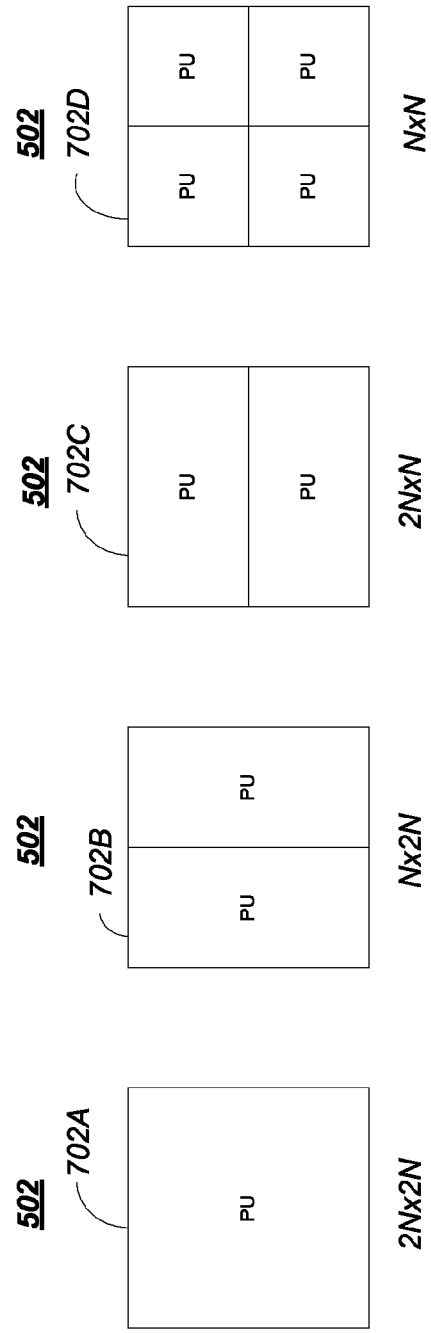
FIG. 7 is a diagram illustrating the partition of a coding unit into one or more prediction units.

FIG. 7 is a diagram illustrating the partition of a CU 502 into one or more PUs 702. A PU 702 corresponds to a partitioned CU 502 and is used to predict pixels values for intra-picture or inter-picture types. PUs 702 are an extension of the partitioning of H.264/AVC for motion estimation, and are defined for each CU 502 that is not further subdivided into other CUs ("split flag"=0). At each leaf 604 of the quadtree 600, a final (bottom level) CU 502 of 2N×2N can possess one of four possible patterns of PUs: 2N×2N (702A), 2N×N (702B), N×2N (702C) and N×N (702D)), as shown in FIG. 7.

A CU 502 can be either spatially or temporally predictive coded. If a CU 502 is coded in "intra" mode, each PU 702 of the CU 502 can have its own spatial prediction direction and image information as further described below. Also, in the "intra" mode, the PU 702 of the CU 502 may depend on another CU 502 because it may use a spatial neighbor, which is in another CU. If a CU 502 is coded in "inter" mode, each PU 702 of the CU 502 can have its own motion vector(s) and associated reference picture(s) as further described below.

Figure 8:
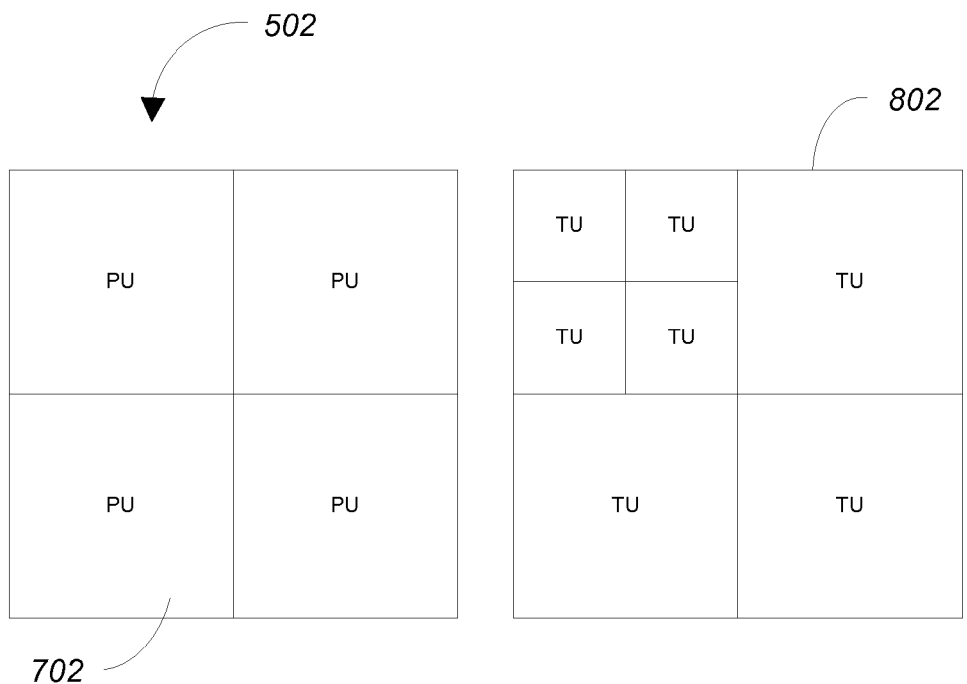
FIG. 8 is a diagram showing a coding unit partitioned into four prediction units and an associated set of transform units.

FIG. 8 is a diagram showing a CU 502 partitioned into four PUs 702 and an associated set of transform units (TUs) 802. TUs 802 are used to represent the elementary units that are spatially transformed by a DCT (Discrete Cosine Transform). The size and location of each block transform TU 802 within a CU 502 is described by a "residual" quadtree (RQT) further illustrated below.

Figure 9:
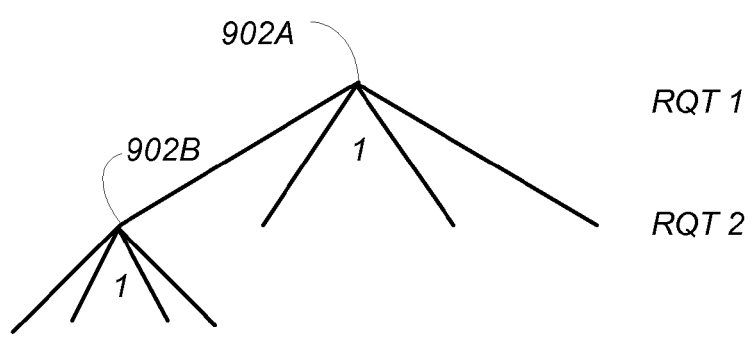
FIG. 9 is a diagram showing RQT codetree for the transform units associated with the coding unit in the example of FIG. 8.

FIG. 9 is a diagram showing RQT 900 for TUs 802 for the CU 502 in the example of FIG. 8. Note that the "1" at the first node 902A of the RQT 900 indicates that there are four branches and that the "1" at the second node 902B at the adjacent lower hierarchical level indicates that the indicated node further has four branches. The data describing the RQT 900 is also coded and transmitted as an overhead in the bitstream 314.

The coding parameters of a video sequence may be stored in dedicated NAL units called parameter sets. Two types of parameter sets NAL units may be employed. The first parameter set type is known as a Sequence Parameter Set (SPS), and comprises a NAL unit that includes parameters that are unchanged during the entire video sequence. Typically, an SPS handles the coding profile, the size of the video frames and other parameters. The second type of parameter set is known as a Picture Parameter Set (PPS), and codes different values that may change from one image to another.

Spatial and Temporal Prediction

One of the techniques used to compress a bitstream 314 is to forego the storage of pixel values themselves and instead, predict the pixel values using a process that can be repeated at the decoder 220 and store or transmit the difference between the predicted pixel values and the actual pixel values (known as the residual). So long as the decoder 220 can compute the same predicted pixel values from the information provided, the actual picture values can be recovered by adding the residuals to the predicted values. The same technique can be used to compress other data as well.

Referring back to FIG. 3, each PU 702 of the CU 502 being processed is provided to a predictor module 307. The predictor module 307 predicts the values of the PUs 702 based on information in nearby PUs 702 in the same frame (intra-frame prediction, which is performed by the spatial predictor 324) and information of PUs 702 in temporally proximate frames (inter-frame prediction, which is performed by the temporal predictor 330). Temporal prediction, however, may not always be based on a collocated PU, since collocated PUs are defined to be located at a reference/non-reference frame having the same x and y coordinates as the current PU 702. These techniques take advantage of spatial and temporal dependencies between PUs 702.

Encoded units can therefore be categorized to include two types: (1) non-temporally predicted units and (2) temporally predicted units. Non-temporally predicted units are predicted using the current frame, including adjacent or nearby PUs 702 within the frame (e.g. intra-frame prediction), and are generated by the spatial predictor 324. Temporally predicted units are predicted from one temporal picture (e.g. P-frames) or predicted from at least two reference pictures temporally ahead and/or behind (i.e. B-frames).

Spatial Prediction

Figure 10:
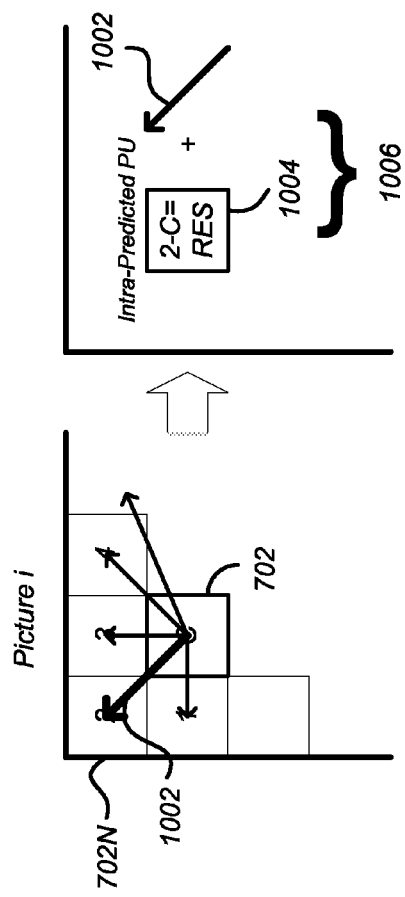
FIG. 10 is a diagram illustrating spatial prediction of prediction units.

FIG. 10 is a diagram illustrating spatial prediction of PUs 702. A picture i may comprise a PU 702 and spatially proximate other PUs 1-4, including nearby PU 702N. The spatial predictor 324 predicts the current block (e.g. block C of FIG. 10) by means of an "intra-frame" prediction which uses PUs 702 of already-encoded other blocks of pixels of the current image.

The spatial predictor 324 locates a nearby PU (e.g. PU 1, 2, 3 or 4 of FIG. 10) that is appropriate for spatial coding and determines an angular prediction direction to that nearby PU. In HEVC, 35 directions can be considered, so each PU may have one of 35 directions associated with it, including horizontal, vertical, 45 degree diagonal, 135 degree diagonal, DC etc. The spatial prediction direction of the PU is indicated in the syntax.

Referring back to the spatial predictor 324 of FIG. 3, this located nearby PU is used to compute a residual PU 704 (*e*) as the difference between the pixels of the nearby PU 702N and the current PU 702, using element 305. The result is an intra-predicted PU element 1006 that comprises a prediction direction 1002 and the intra-predicted residual PU 1004. The prediction direction 1002 may be coded by inferring the direction from spatially proximate PUs, and the spatial dependencies of the picture, enabling the coding rate of the intra prediction direction mode to be reduced.

Temporal Prediction

Figure 11:
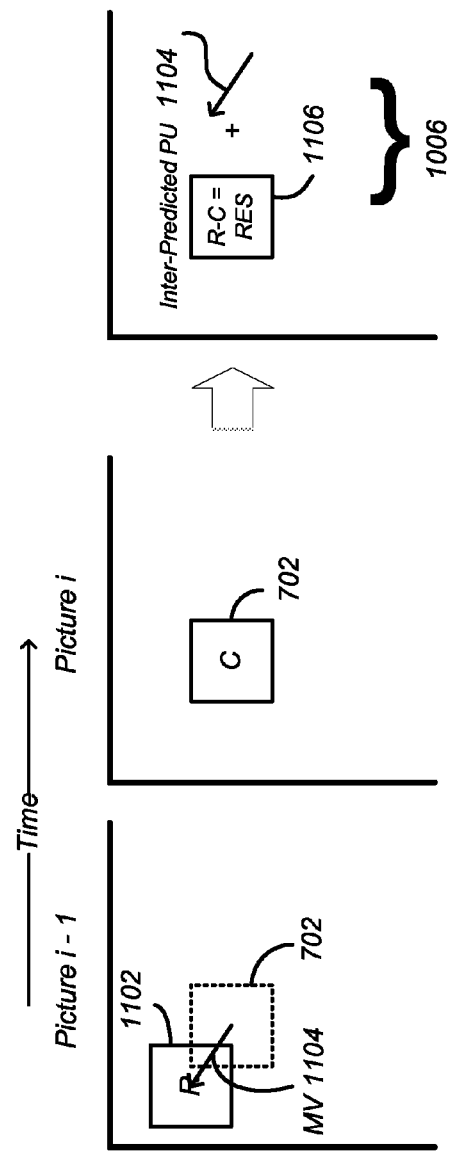
FIG. 11 is a diagram illustrating temporal prediction.

FIG. 11 is a diagram illustrating temporal prediction. Temporal prediction considers information from temporally neighboring pictures or frames, such as the previous picture, picture i−1.

Generally, temporal prediction includes single-prediction (P-type), which predicts the PU 702 by referring to one reference area from only one reference picture, and multiple prediction (B-type), which predicts the PU by referring to two reference areas from one or two reference pictures. Reference images are images in the video sequence that have already been coded and then reconstructed (by decoding).

The temporal predictor 330 identifies, in one or several of these reference areas (one for P-type or several for B-type), areas of pixels in a temporally nearby frame so that they can be used as predictors of this current PU 702. In the case where several areas predictors are used (B-type), they may be merged to generate one single prediction. The reference area 1102 is identified in the reference frame by a motion vector (MV) 1104 that is defines the displacement between the current PU 702 in current frame (picture i) and the reference area 1102 (refIdx) in the reference frame (picture i−1). A PU in a B-picture may have up to two MVs. Both MV and refIdx information are included in the syntax of the HEVC bitstream.

Referring again to FIG. 3, a difference between the pixel values between of the reference area 1102 and the current PU 702 may be computed by element 305 as selected by switch 306. This difference is referred to as the residual of the inter-predicted PU 1106. At the end of the temporal or inter-frame prediction process, the current PU 1006 is composed of one motion vector MV 1104 and a residual 1106.

However, as described above, one technique for compressing data is to generate predicted values for the data using means repeatable by the decoder 220, computing the difference between the predicted and actual values of the data (the residual) and transmitting the residual for decoding. So long as the decoder 220 can reproduce the predicted values, the residual values can be used to determine the actual values.

This technique can be applied to the MVs 1104 used in temporal prediction by generating a prediction of the MV 1104, computing a difference between the actual MV 1104 and the predicted MV 1104 (a residual) and transmitting the MV residual in the bitstream 314. So long as the decoder 220 can reproduce the predicted MV 1104, the actual MV 1104 can be computed from the residual. HEVC computes a predicted MV for each PU 702 using the spatial correlation of movement between nearby PUs 702.

Figure 12:
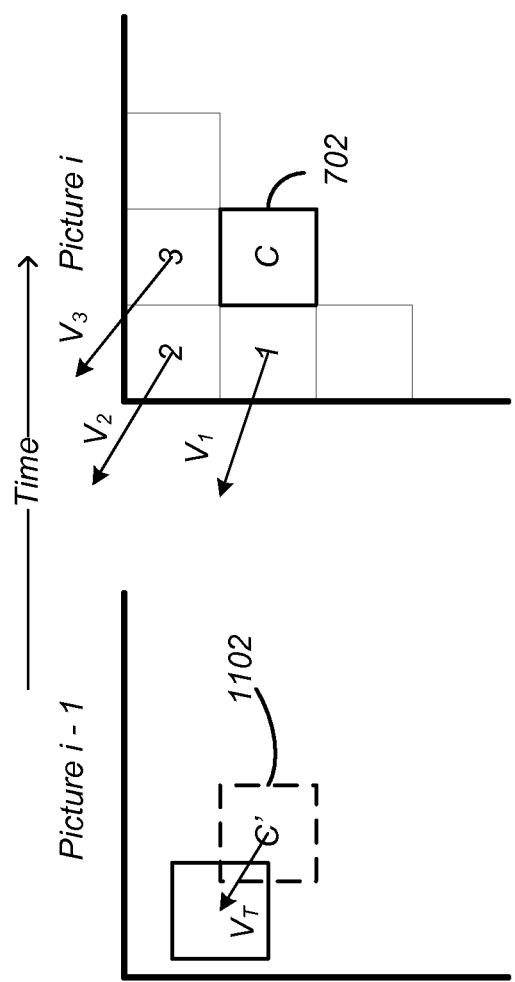
FIG. 12 is a diagram illustrating the use of motion vector predictors (MVPs)

FIG. 12 is a diagram illustrating the use of motion vector predictors (MVPs) in HEVC. Motion vector predictors V1, V2 and V3 are taken from the MVs 1104 of a plurality of blocks 1, 2, and 3 situated nearby or adjacent the block to encode (C). As these vectors refer to motion vectors of spatially neighboring blocks within the same temporal frame and can be used to predict the motion vector of the block to encode, these vectors are known as spatial motion predictors.

FIG. 12 also illustrates temporal motion vector predictor VT which is the motion vector of the co-located block C' in a previously decoded picture (in decoding order) of the sequence (e.g. block of picture i−1 located at the same spatial position as the block being coded (block C of image i).

The components of the spatial motion vector predictors V1, V2 and V3 and the temporal motion vector predictor VT can be used to generate a median motion vector predictor VM. In HEVC, the three spatial motion vector predictors may be taken as shown in FIG. 12, that is, from the block situated to the left of the block to encode (V1), the block situated above (V3) and from one of the blocks situated at the respective corners of the block to encode (V2), according to a predetermined rule of availability. This MV predictor selection technique is known as Advanced Motion Vector Prediction (AMVP).

A plurality of (typically five) MV predictor (MVP) candidates having spatial predictors (e.g. V1, V2 and V3) and temporal predictor(s) VT is therefore obtained. In order to reduce the overhead of signaling the motion vector predictor in the bitstream, the set of motion vector predictors may reduced by eliminating data for duplicated motion vectors (for example, MVs which have the same value as other MVs may be eliminated from the candidates).

The encoder 202 may select a "best" motion vector predictor from among the candidates, and compute a motion vector predictor residual as a difference between the selected motion vector predictor and the actual motion vector, and transmit the motion vector predictor residual in the bitstream 314. To perform this operation, the actual motion vector must be stored for later use by the decoder 220 (although it is not transmitted in the bit stream 314. Signaling bits or flags are included in the bitstream 314 to specify which MV residual was computed from the normalized motion vector predictor, and are later used by the decoder to recover the motion vector. These bits or flags are further described below.

Referring back to FIG. 3, the intra-predicted residuals 1004 and the inter-predicted residuals 1106 obtained from the spatial (intra) or temporal (inter) prediction process are then transformed by transform module 308 into the transform units (TUs) 802 described above. A TU 802 can be further split into smaller TUs using the RQT decomposition described above with respect to FIG. 9. In HEVC, generally 2 or 3 levels of decompositions are used and authorized transform sizes are from 32×32, 16×16, 8×8 and 4×4. As described above, the transform is derived according to a discrete cosine transform (DCT) or discrete sine transform (DST).

The residual transformed coefficients are then quantized by quantizer 310. Quantization plays a very important role in data compression. In HEVC, quantization converts the high precision transform coefficients into a finite number of possible values. Although the quantization permits a great deal of compression, quantization is a lossy operation, and the loss by quantization cannot be recovered.

The coefficients of the quantized transformed residual are then coded by means of an entropy coder 312 and then inserted into the compressed bit stream 310 as a part of the useful data coding the images of the AV information. Coding syntax elements may also be coded using spatial dependencies between syntax elements to increase the coding efficiency. HEVC offers context-adaptive binary arithmetic coding (CABAC). Other forms or entropy or arithmetic coding may also be used.

In order to calculate the predictors used above, the encoder 202 decodes already encoded PUs 702 using "decoding" loop 315, which includes elements 316, 318, 320, 322, 328. This decoding loop 315 reconstructs the PUs and images from the quantized transformed residuals.

The quantized transform residual coefficients E are provided to dequantizer 316, which applies the inverse operation to that of quantizer 310 to produce dequantized transform coefficients of the residual PU (E') 708. The dequantized data 708 is then provided to inverse transformer 318 which applies the inverse of the transform applied by the transform module 308 to generate reconstructed residual coefficients of the PU (e') 710.

The reconstructed coefficients of the residual PU 710 are then added to the corresponding coefficients of the corresponding predicted PU (x') 702' selected from the intra-predicted PU 1004 and the inter-predicted PU 1106 by selector 306. For example, if the reconstructed residual comes from the "intra" coding process of the spatial predictor 324, the "intra" predictor (x') is added to this residual in order to recover a reconstructed PU (x") 712 corresponding to the original PU 702 modified by the losses resulting from a transformation, for example in this case the quantization operations. If the residual 710 comes from an "inter" coding process of the temporal predictor 330, the areas pointed to by the current motion vectors (these areas belong to the reference images stored in reference buffer 328 referred by the current image indices) are merged then added to this decoded residual. In this way the original PU 702 is modified by the losses resulting from the quantization operations.

To the extent that the encoder 202 uses motion vector prediction techniques analogous to the image prediction techniques described above, the motion vector may be stored using motion vector buffer 329 for use in temporally subsequent frames. As further described below, a flag may be set and transferred in the syntax to indicate that the motion vector for the currently decoded frame should be used for at least the subsequently coded frame instead of replacing the contents of the MV buffer 329 with the MV for the current frame.

A loop filter 322 is applied to the reconstructed signal (x") 712 in order to reduce the effects created by heavy quantization of the residuals obtained, and to improve the signal quality. The loop filter 322 may comprise, for example, a deblocking filter for smoothing borders between PUs to visually attenuate high frequencies created by the coding process and a linear filter that is applied after all of the PUs for an image have been decoded to minimize the sum of the square difference (SSD) with the original image. The linear filtering process is performed on a frame by frame basis and uses several pixels around the pixel to be filtered, and also uses spatial dependencies between pixels of the frame. The linear filter coefficients may be coded and transmitted in one header of the bitstream typically a picture or slice header.

The filtered images, also known as reconstructed images, are then stored as reference images from reference image buffer 328 in order to allow the subsequent "Inter" predictions taking place during the compression of the subsequent images of the current video sequence.

Entropy Coding

The coding performed by coder 312 is performed by coding each coefficient of the quantized transform coefficients of the transform unit (TU) 802 obtained from the transformer 308 and quantizer 310. Such coding is typically performed for each transform coefficient or group of coefficients using one of a plurality of available scan patterns.

Figure 13:
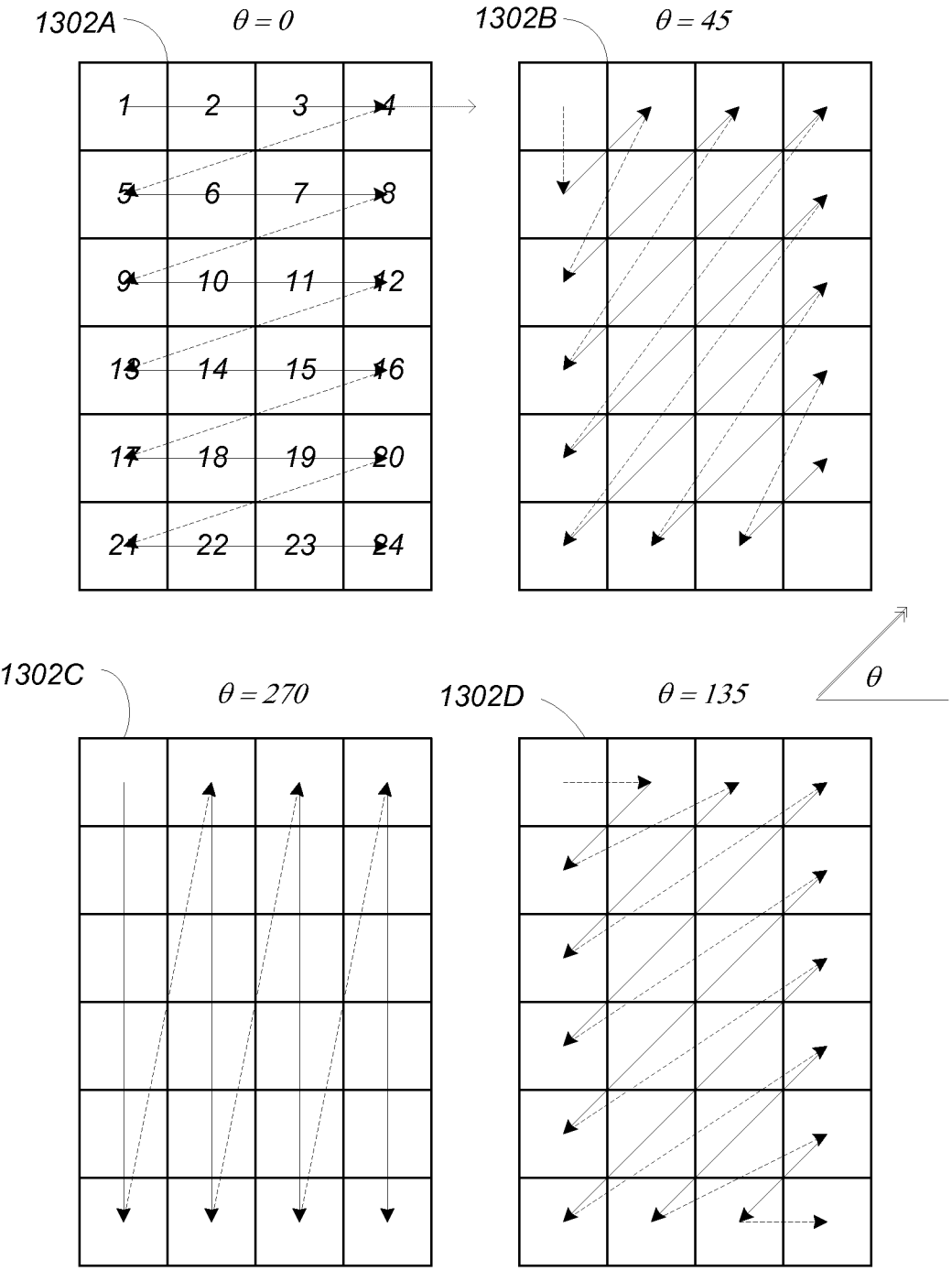
FIG. 13 is a diagram illustrating exemplary scan patterns used for coding of the quantized coefficients of a non-square transform unit.

FIG. 13 is a diagram illustrating exemplary scan patterns used for coding of the quantized coefficients of a non-square (4×6) TU 802. These scan patterns include a horizontal scan pattern 1302A (scan angle θ=0 degrees), zig-zag, diagonal patterns 1302B and 1302D (scan angle θ=45 and 135 degrees), and vertical scan 1302C (scan angle=270 degrees). Wavefront scanning (in which the encoder 312 uses information from the preceding row of TUs 802, enabling parallel processing that may allow for better compression than simple tiling) may be performed in any direction.

The illustrated scan patterns begin at the TU 802 coefficient at the upper right of each TU 802 and ends at the lower right coefficient of the TU 802. However, the scan pattern may begin at the lower right coefficient 24 and end at the upper left coefficient 1, or for that matter, may follow a pattern from the innermost coefficient positions to the outermost coefficient positions, following a clockwise (e.g. 10, 11, 14, 15, 19, 18, 17, 13, 9, 5, 6, 7, 8, 12, 16, 20, 24, 23, 22, 21, 1, 2, 3, 4) or counter-clockwise pattern or a pattern that follows the outermost coefficient positions inward. Further, the scan pattern need not be continuous (e.g. 10, 15, 14, 11, etc.). As will be described further below, once the last significant (non-zero) coefficient position is known, the coefficients can be decoded in the opposite direction of the scan pattern back to the first coefficient in the scan pattern.

FIG. 14A is a diagram of an exemplary TU 802 coefficient map 1402. Note that many of the coefficients are zero coefficients (e.g. their value is zero). For each TU 802 and at each scanned position, a bit may be assigned or set to indicate if the corresponding coefficient is zero or not, resulting in a significance map 1452 that is associated with each TU 802.

FIG. 14B is a diagram showing an exemplary significance map 1452 of the TU 802 coefficients illustrated in FIG. 14A. Non-zero coefficients are indicated with a logical 1 and zero coefficients are indicated with a logical 0 (although a different mapping may be used).

Returning to the example of FIG. 14A, if the scan pattern is a horizontal scan pattern 1302A, the last non-zero coefficient of the TU 802 is coefficient 1404. This can also be seen in FIG. 14B, as the significance map element associated with coefficient 1404 is a logical 1 and is the last element in the horizontal scan pattern 1202A.

Regardless of which scan technique or pattern is used, all quantized coefficients must be scanned, except those along the scan pattern that are beyond the last coded coefficient of a TU 802. However, as HEVC is currently defined, it is possible that all of the coefficients of the TU 802 will be scanned unless there is a reliable means for identifying and skipping the remainder of the coefficients after the last non-zero coefficient in the scan pattern. Ideally, the means for identifying the last non-zero coefficient should strike a balance between minimizing processing and the size of the resulting bitstream 314.

As described above with reference to the encoder 312 illustrated in FIG. 3, HEVC implements context adaptive coding such as context adaptive binary arithmetic coding (CABAC). CABAC is a form of entropy encoding that encodes binary symbols using probability models. A non-binary valued symbol (such as a transform unit coefficient or motion vector) is binarized or converted into a binary code prior to arithmetic coding. Stages are repeated for each bit (or "bin") of the binarized symbol.

A context model is a probability model for one or more bins of the binarized symbol. This model may be chosen from a plurality of available models depending on the statistics of recently-coded data symbols. The context model stores the probability of each bin being "1" or "0". An arithmetic coder then encodes each bin according to the selected probability model.

A context variable is a variable specified for the adaptive binary arithmetic decoding process of a bin by an equation containing recently decoded bins. A cabac_init_flag specifies the method for determining the initialization table used in the initialization process for context variables. The value of cabac_init_flag is in the range of 0 to 1, inclusive. When cabac_init_flag is not present, it is inferred to be 0.

The initialization of context variables is performed as follows. For each context variable, the two variables pStateIdx (probability state index) and valMPS (value of most probable symbol) are initialized. From a table entry initValue, the two 4 bit variables (slopeIdx and intersecIdx) are derived according to the following pseudo-code process:

```
slopeIdx = initValue >> 4
intersecIdx = initValue & 15
    Slope m and Intersec n are derived from the indices as follows:
m = slopeIdx*5 − 45
n = ( intersecIdx << 3 ) − 16
```

The last significant coefficient of a TU 802 in a scan pattern may identified by the variables last_significant_coeff_x and last_significant_coeff_y.

FIG. 15A presents a table for determining the initialization variables m and n according to the last_significant_coeff_x and last_significant_coeff_y variables. For 16×16 TU 802, the range of the variables last_significant_coeff_x and last_significant_coeff_y is from 0 to 15. The coefficients for the first half of the position range (0-7) are decoded using context based model as indicated. Six contexts are used for the luminescence (Luma) 16×16 TU. That is, ctxIdx 6-11 are for I-type intra coded pictures, ctxIdx 37-42 are for P-type inter coded pictures, and ctxIdx 68-73 are for B-type inter coded picture. FIG. 15B presents a table showing the ctxIdx offset for different CU 502 typed.

For 32×32 TU 802, the last_significant_coeff_x and last_significant_coeff_y range from 0 to 31. The first half of the position (range 0-15) are decoded using context based model in the table shown in FIG. 15A. Seven contexts are used for a Luma 32×32 TU. That is, ctxIdx 12-18 are for I-type intra coded pictures, ctxIdx 43-49 are for P-type inter coded pictures, and ctxIdx 74-80 are for B-type inter-coded pictures. Further, the possible range of either the last_significant_coeff_x or last_significant_coeff_y for rectangular TUs 802 (32×8, 8×32, 16×4, and 4×16) is the value for the maximum of the longest dimension of the TU 802. Hence, generally, the range of either last_significant_coeff_x or last_significant_coeff_y could be from 0-31 for any M×N TU where max(M,N) is larger than 16.

Scanning all of the TU 802 coefficients, even those with a value of zero causes the encoder 312 to perform additional calculations and the encoder 312 to perform additional calculations and to send more bits in the bitstream 314 than are necessary for the decoding process. Further exacerbating the problem, the probability of having a scan row, column, or diagonal with only zero coefficients may be higher with the non-square TUs 802 introduced in HEVC.

Further, because of the large range (0-31) of last_significant_coeff_x and last_significant_coeff_y, the last coefficient position coding requires a large number of bits to code two numbers from 0-31 and a large number of contexts and bins to support multiple TU 802 sizes as shown in FIG. 15A.

Last Coefficient Coding and Decoding

One technique to reduce the size of the bitstream 314 and the bins necessary for the coding of the quantized TU 802 coefficients is to encode a flag in the bitstream syntax that indicates when a particular portion of the TU 802 coefficients in a portion of the scan pattern has at least one non-zero coefficient. Generally, this technique introduces a flag for a scan row, column or diagonal (for diagonal, maybe only certain size will have that flag), depending the scan pattern. If a scan row, column, or diagonal has only zero coefficients, the flag is set to be 0; otherwise, 1. This introduced flag uses fewer bits than directly encoding the last significant coefficient of the transform unit, while maintaining adequate performance. To further reduce the overhead of flag bits, the number of set flags may be reduced by not setting any flags for remaining rows or columns in the scan pattern if they have all zero coefficients. The flag bit overhead can be still further reduced because the last row or column may be inferred from the flag for the preceding row or column. These features are described in more detail below.

Figure 16A:
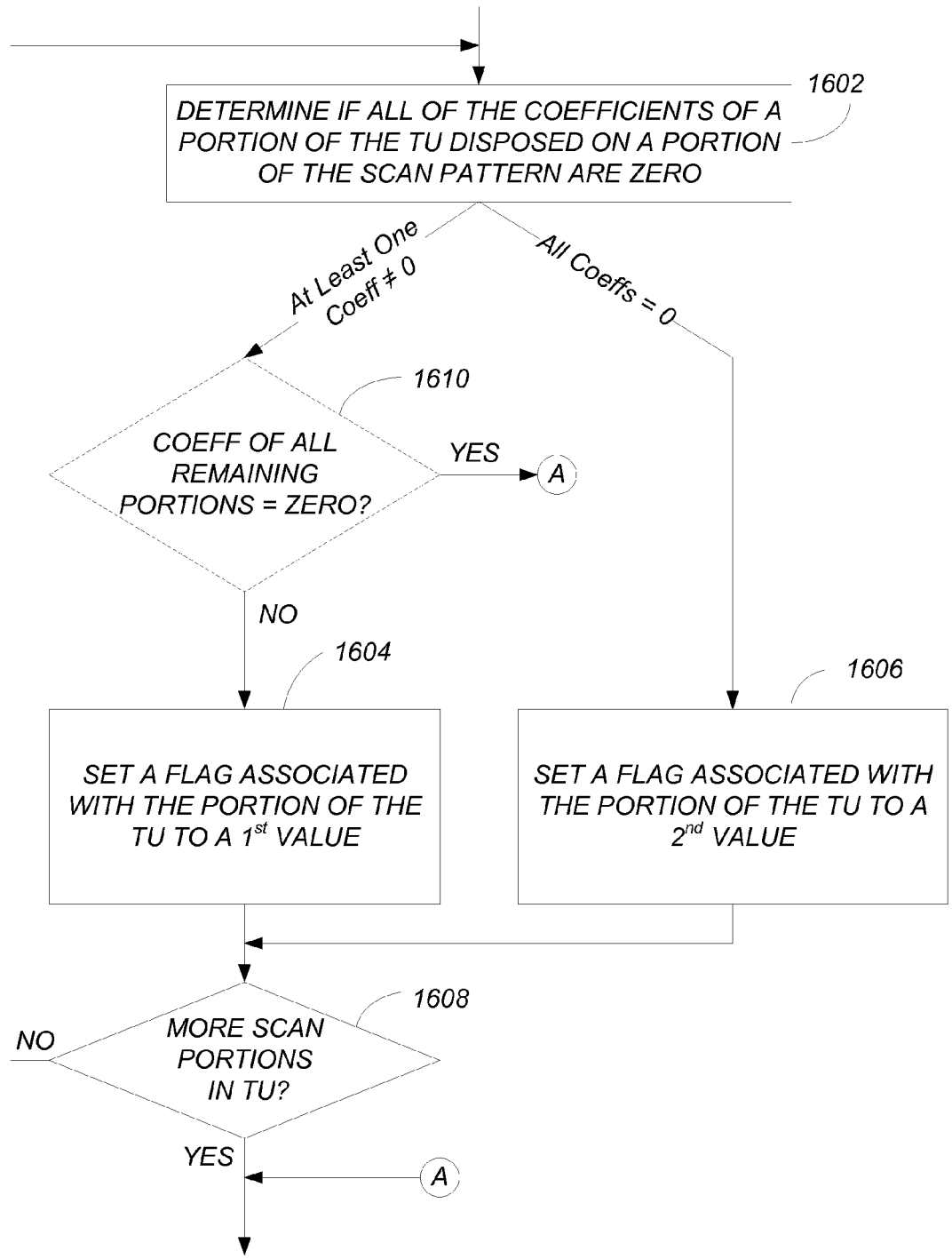
FIG. 16A is diagram presenting an exemplary technique for performing a last coefficient coding technique that can be used in an HEVC encoding/decoding system.

FIG. 16A is diagram presenting an exemplary technique for performing a last coefficient coding technique that can be used in an HEVC encoding/decoding system 202. In block

1602, a determination is made as to whether all of the coefficients of a portion of the TU 802 disposed on a portion of a scan pattern in zero. Block 1604 sets a flag associated with the portion of the TU 802 to a first value if at least one of the coefficients of the portion of the TU 802 on the portion of the scan pattern is non-zero. Block 1606 sets a flag associated with the portion of the TU 802 to a second value if all of the coefficients of the portion of the TU 802 on the portion of the scan pattern are zero. Block 1608 determines if all of the scan portions have been considered. If not, processing passes back to block 1602 for consideration of the next portion of the TU 802 coefficients on the next portion of the scan pattern. If all of the scan portions have been considered, processing for the instant last coefficient processing for the TU under consideration is completed, and processing for the next TU or other task may begin. Block 1610 is optional further embodiment that is further discussed below.

Figure 17:
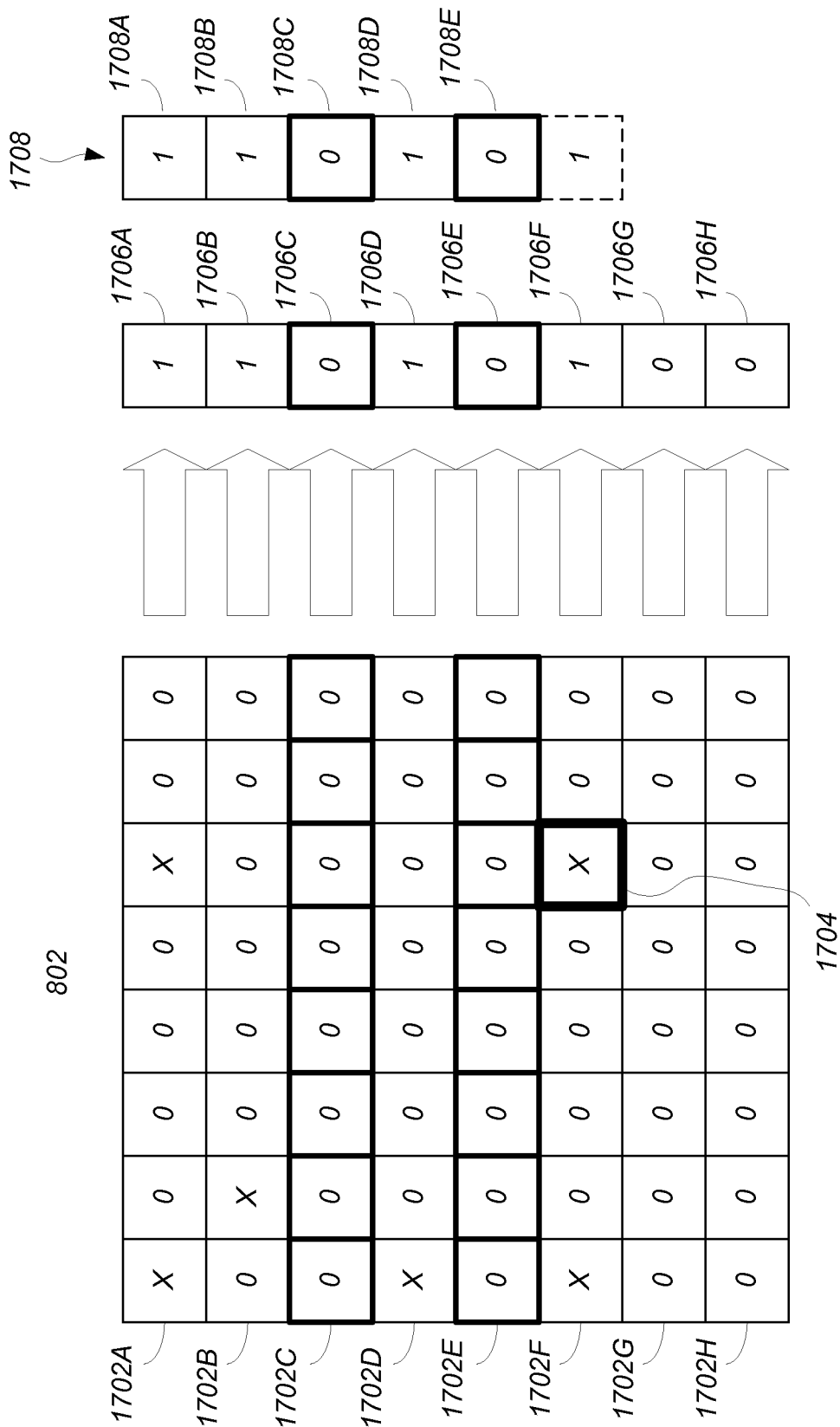
FIG. 17 is a diagram illustrating the operations of FIGS. 16A and 16B.

FIG. 17 is a diagram illustrating the operations of FIG. 16A. For purposes of simplicity, FIG. 17 discloses an embodiment using the horizontal scan pattern 1302A illustrated in FIG. 13. In this scan pattern 1302A, a first portion of the TU 802 coefficients (e.g. those in the first row) on the first portion 1702A of the scan pattern includes at least one non-zero coefficient, namely, the zeroth and fifth coefficients of scan portion 1702A. Therefore, block 1604 sets first flag 1706A associated with the first portion of TU 802 coefficients on the first portion of the scan pattern 1702A to a logical 1.

Block 1608 determines that there are more scan portions remaining in the scan pattern (e.g. scan pattern portions 1702B-1702H), so processing is routed back to block 1602, which again determines if there is at least one non-zero coefficient the portion of the TU 802 transform coefficients of the next scan pattern portion 1702B. In the illustrated example, the second portion 1702 of the scan pattern 1302A also includes at least one non-zero coefficient (the second coefficient), hence, block 1604 sets a second flag 1706B associated with the second portion 1702B of the transform coefficients on a second portion of the scan pattern 1302A.

Again, block 1608 determines that there are more scan portions 1702C-1702H remaining in the scan pattern 1302A, so processing is routed to block 1602 and third portion 1702C of the coefficients of the TU 802 are examined. In this case, all of the coefficients of the third portion of the TU on the third portion 1702C of the scan patter 1302A are zero, so block 1606 sets third flag 1706C to zero, indicating that that portion of the scan pattern 1302A includes TU 802 coefficients that are all zero.

This process is repeated until all of the coefficients of the TU 802 have been examined, and a flag has been set or not set to indicate whether the associated scan portion 1702A-1702H (and portion of TU 802 coefficients) have any non-zero values. In the illustrated embodiment, the since flag 1706A, 1706V, 1706D, and 1706F have a value of one, it is known that at least one of these scan portion coefficients (in this case, rows) have a non-zero value. That the remaining flags have a value of zero indicates that those scan portion coefficients all have a value of zero.

Although the scan pattern 1302A for this example is a row-by-row can pattern for purposes of illustrative simplicity, the same technique can be used for any scan pattern, including column-by-column scanning 1302C, either of the diagonal scan patterns 1302B and 1302D, wavefront scanning, or even circular or non-continuous scan patterns. All that is required is that a flag or other artifice be set to a value indicating the zero/non-zero status of an associated portion of the TU 802 coefficients on an associated portion of the scan pattern 1302.

The entropy coding of the TU 802 coefficients themselves may be performed after each individual coefficient is examined to determine whether it has a non-zero value, after the entire scan portion (e.g. row, column, or diagonal) has been examined to determine whether there are any non-zero coefficients (for example, after block 1602 or block 1606 of FIG. 16A) or after the entire TU 802 has been scanned to determine whether there are any non zero coefficients (after the operations shown in FIG. 16A have all been completed). By indicating the last scan portion 1702F that includes a non-zero value, the foregoing paradigm allows the encoder and decoder to forego the decoding of TU 802 coefficients that have zero values, thus saving bits in the bitstream 314 and the associated processing required to decode the encoded TU 802 coefficients. In one embodiment, the flags 1706 described above may be known as last_TU_scan_portion flags, which are sent in the syntax and associated with the TU 802.

Indicating the last non-zero coefficient in the scan pattern by a simple number or two numbers analogous to Cartesian coordinates (e.g. last_significant_coeff_x and last_significant_coeff_y) can also result in bitstream 314 and processing savings. However, particularly with the larger TUs made possible under HEVC, (which can be as large as 32×32), a significant number of bits are wasted. The foregoing technique allows the processing of zero coefficients to be reduced, while substantially reducing the number of bits required in the bitstream 314 for last coefficient signaling.

While the foregoing reduces the number of zero value TU 802 coefficients to be encoded, it still may result in some number of zero value TU 802 coefficients to be encoded, for example, the last two coefficients in row 1702F. This number may be further reduced by setting an additional flag (for example, a last_scan_portion_position flag) associated only with the last scan portion that indicates that the particular coefficient is the last coefficient 1704 in the last portion of the scan pattern to have a non-zero value.

Further, while the foregoing example used a flag as an indicator of the existence of a non-zero coefficient in the scan portion, any analogous artifice can be used for such signaling. For example, an index or other value can be used.

The number of bits required to indicate that last scan portion can be further reduced, as indicated by dashed block 1610 of FIG. 16A. Block 1610 determines whether all of the coefficients of the remaining portions of the TU 802 are zero. If not (non-zero coefficients remain in the remainder of TU 802 and scan portions), block 1612 allows processing to be routed to block 1604 to consider the next scan portion, as before. However, if all of the coefficients of the remaining portion of the TU 802 are zero, coding of TU 802 under consideration is ceased.

Referring back to the example presented in FIG. 17, the processing of scan portions 1702A-1702E proceed as before, and flags 1706A-1706E are set as indicated in the diagram. However, after flag 1706E is set, processing is routed to block 1608, which determines that there are more portions of the scan pattern to be considered, and processing is thereby routed back to block 1602. Block 1602 determines that there is at least one non-zero coefficient in scan pattern portion 1702F (in fact, there are two). Next, processing is passed to block 1610, which considers whether the coefficients of all of the remaining portions of the TU 802 (e.g. the coefficients in scan portions 1702G and 1702H are equal to zero. In the example shown in FIG. 17, all of the remaining portions of the TU 802 have zero coefficients, so block 1610 routes processing to link A, which ends the last coefficient processing for the TU 802 under consideration. The resulting set of last coefficient flags associated with the TU belong to a last coefficient flag set 1708 which now excludes flags associated with scan portions 1702G and 1702H. This saves three bits of information otherwise used in the baseline embodiment. Note that this technique also saves an additional bit over simply foregoing the addition of any trailing zero flags such as flags 1706G and 1706H to the last coefficient flag set when the last two scan portions 1702G and 1702H have all zero coefficients. This is possible because the information conveyed by the fact that flag 1706E is the last flag in the set of last coefficient flags is sufficient to infer that the next row or portion of the scan is the last portion with a non-zero TU coefficient.

Figure 16B:
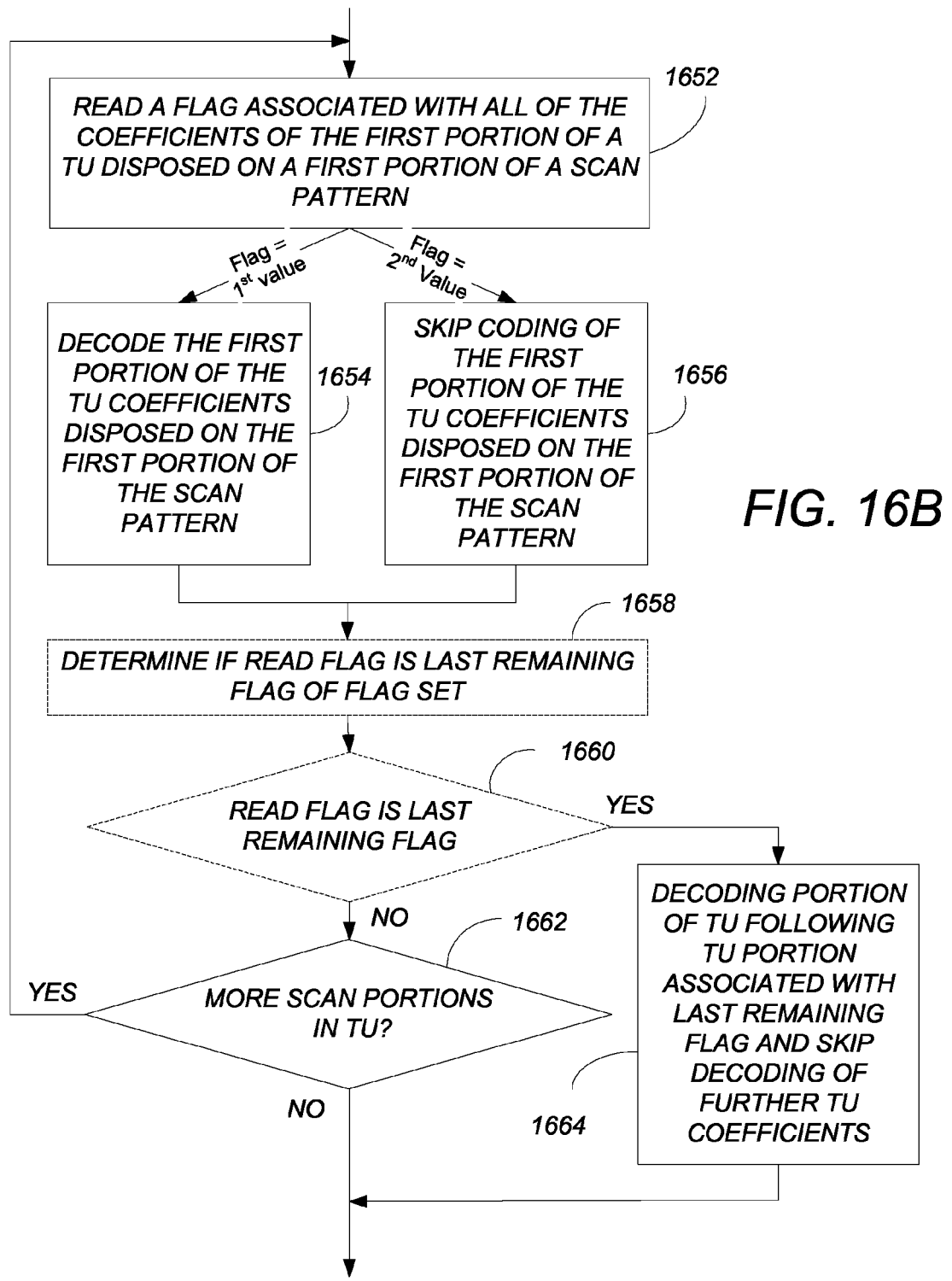
FIG. 16B is a diagram illustrating the decoding of the encoded bitstream, using the last coefficient coding described in FIG. 16A.

FIG. 16B is a diagram illustrating the decoding of the encoded bitstream 314, using the last coefficient coding. In block 1652, a flag 1706 associated with all of the coefficients of a first portion of a TU 802 disposed on a first portion of a scan pattern is read. If the flag 1706 has the first value, the first portion of the TU 802 coefficients disposed in the first portion of the scan pattern are decoded, as shown in block 1654. If the flag 1706 has a second value, the coding of the first portion of TU 802 coefficients disposed on the first portion of the scan pattern 1702A is skipped, as shown in block 1656. Block 1662 checks to determine if there are any more scan portions 1702 in the TU 802. If there are additional scan portions 1702, processing is routed back to block 1652, whereas if there are no additional scan portions, decoding processing for the TU 802 under consideration is terminated.

For example, referring back to FIG. 17, flag 1706A indicates that there is a non-zero coefficient in the first portion 1702A of the scan pattern. Accordingly, processing is routed to block 1654, and the first portion of the TU coefficients (those in the scan row portion 1702 are decoded. The process is completed for scan pattern portion 1702B because flag 1706 is also set to one, indicating that there is a non-zero coefficient value in the TU 802 coefficients of the second scan pattern portion 1702B. Flag 1706C indicates that all coefficients in scan pattern portion 1702C have the second value, and decoding of the associated coefficients of the TU 802 in the scan portion 1702C is skipped. This process is repeated for the remaining flags 1706D-1706H.

Dashed blocks 1658 and 1662 refer decoding using the optional embodiment introduced in block 1610 of FIG. 16A. Block 1658 determines whether the read flag is the last remaining flag of a flat set 1708. If either the read flag 1706 is not the last remaining flag of the flag set, processing is routed to block 1662 and is continues as previously described. But if the read flag is the last remaining flag of the flag set, the portion of the TU 802 coefficients associated with the portion of the scan pattern 1702 following the current scan portion 102 associated with the remaining flag are decoded, and coding of the remaining coefficients of the TU 802 is skipped, as shown in block 1664.

For example, referring again to FIG. 17, the last remaining flag of the flag set 1708 is flag 1708E, which has a value of zero. Since this is the last remaining flag of the flag set 1708, block 1664 decodes the coefficients of the portion of the TU 802 following the portion associated with the last remaining flag 1706E (which includes the coefficients in scan pattern portion 1702F, and skips the decoding of the remaining coefficients in the TU 802 being decoded, including the coefficients in scan portions 1702G and 1702H.

In the examples presented, the coding and decoding of the TU 802 coefficients and the setting of the flags 1706 or 1708 was performed following the scan pattern 1302A in the direction. As described in FIG. 16B, the decoding of the coefficients can be performed in the same direction, or may be coded in an opposite direction from the scan pattern.

For example, referring to FIG. 17, the decoding of the encoded TU 802 coefficients can be performed by starting from scan portion 1702H, the last scan portion. Flags 1706H and 1706G indicate that scan portions 1702H and 1702G have all zero TU 802 coefficients, so the decoding of the coefficients in these scan pattern portions, if they are in the bitstream 314 at all, can be skipped. Flag 1706F indicates that scan pattern portion 1702F includes some non-zero coefficients, so the coefficients of this portion of the TU 802 can be decoded. This process can then continue for the remainder of the TU 802 coefficients. Or, logic can be inserted prior to block 1652 that determines the last flag associated with the scan pattern that has the first value (e.g. 1706F), and simply begin decoding of the coefficients of the scan portion associated with that flag (e.g. 1706F) and the remaining scan portions of the TU 802 prior to that scan portion (e.g. 1702E-1702A).

Similarly, in the alternative embodiment shown in the dashed blocks of FIGS. 16A and 16B, the last flag 1708E of the flag set 1708 indicates that the last scan pattern portion 1702 with a non-zero TU 802 coefficient is the scan pattern portion that follows the scan pattern portion associated with the last flag 1708, or scan pattern portion 1702F. Decoding of the TU coefficients can therefore begin with the TU 802 coefficients in scan pattern portion 1702F and end with scan pattern portion 1702A.

The illustrations used to describe the foregoing used a row by row scan pattern such as is illustrated in 1302A of FIG. 13. It is noted, however, that the technique itself can be performed with a diagonal scan pattern or any scan pattern, so long as the appropriate flag is associated with the portion of the scan pattern. It is also noted that a rule can be imposed for diagonal scan patterns (or others in which the number of coefficients in the scan pattern vary from portion to portion) in which the flag indicating the zero/non-zero status of the in the scan portion is only used when the scan portion has a minimum number of coefficients.

Last Coefficient Group Position Encoding and Decoding

Another technique to reduce the size of the bitstream 314 and the bins necessary for the coding of the quantized TU 802 coefficients is to encode a flag in the bitstream syntax that indicates when a particular portion or group of TU 802 coefficients in a portion of a scan pattern has at least one non-zero coefficient.

Figure 18A:
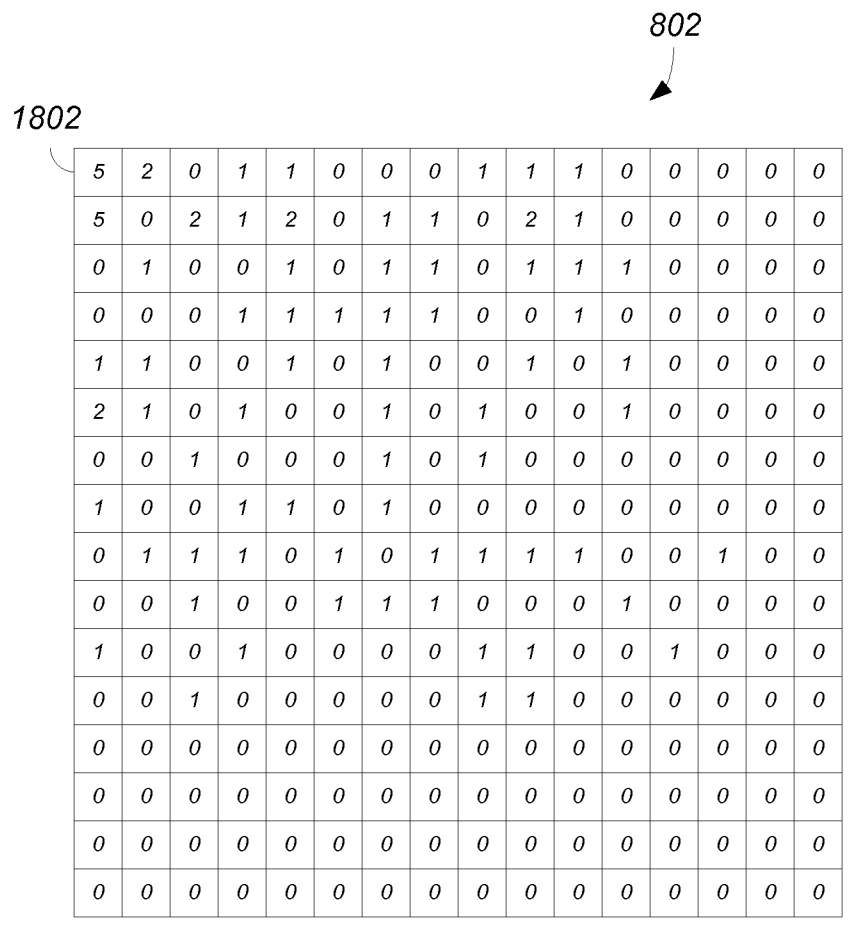
Figures 18B, 18C:
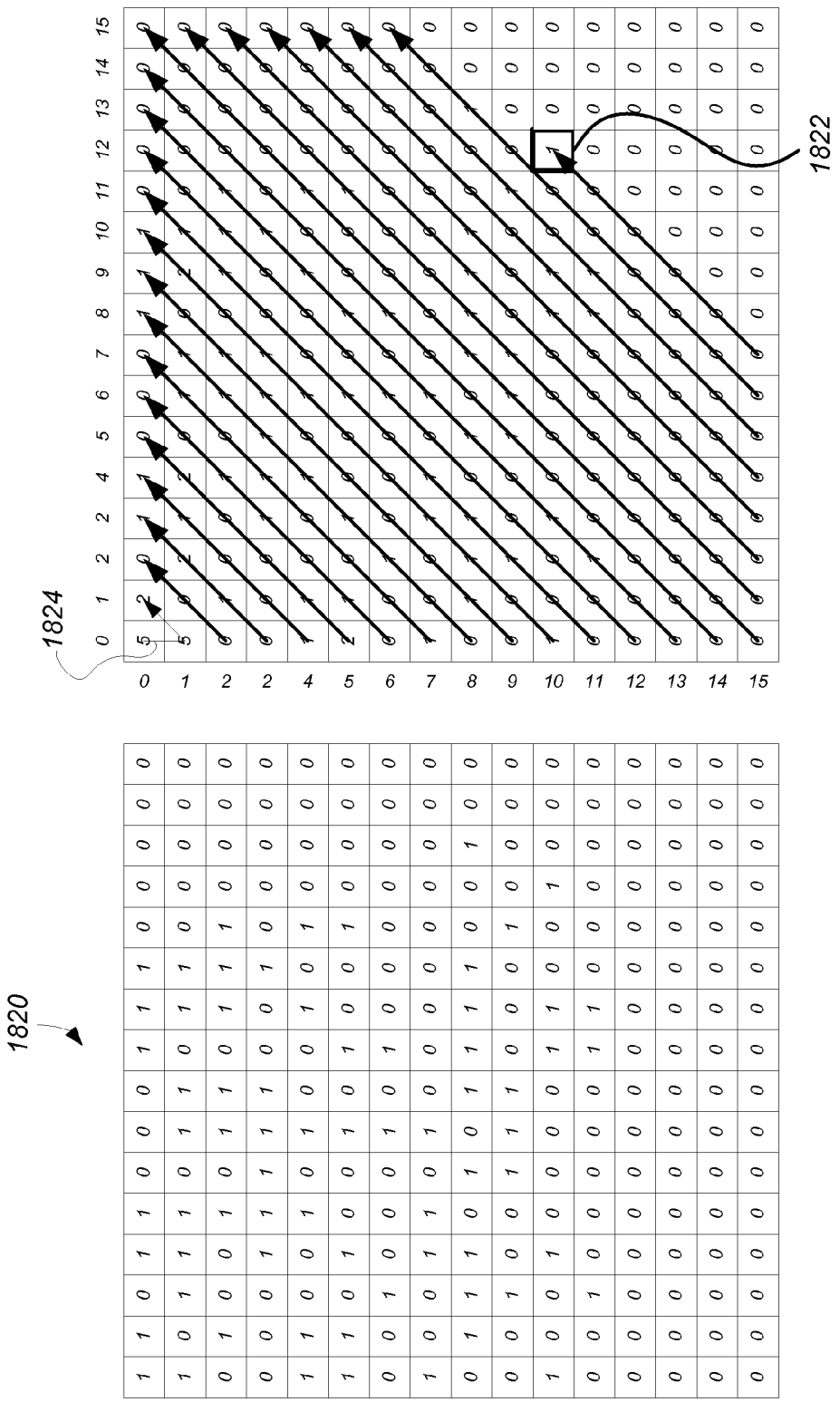
FIG. 18B is a significance map generated from the transform unit illustrated in FIG. 18A.
FIG. 18C is a diagram illustrating an exemplary array scan pattern and a last significant coefficient of a transform unit.

FIG. 18A is a diagram of 16×16 TU 802 having a plurality of coefficients 1802, and FIG. 18B is a significance map generated from the TU 802 illustrated in FIG. 18A. The significance map 1820 has a "1" in each coefficient position having a non-zero value.

The TU 802 shown in FIG. 18A may be scanned and encoded coefficient-by-coefficient using a diagonal scan pattern 1824 analogous to the scan pattern of 1302A, as shown in FIG. 18C. Note that the last non-zero coefficient 1822 is located in the 12th position in the x direction and the 10th position in the y direction. Since the remaining coefficients are zero, they need not be entropy encoded, nor need they be decoded by the decoder 258. By not encoding these coefficients, the bitstream 314 is correspondingly reduced and the processing required at both the encoder 240 and decoder 258 can be reduced. To implement this functionality, the last non-zero coefficient 1822 of the TU 802 in the scan pattern 1824 is indicated in the syntax associated with the TU 802 in Cartesian coordinates using variables known as last_significant_coeff_x and last_significant_coeff_y. These values are passed in the bitstream 314 along to the decoder. In the example shown in FIG. 18C, last_significant_coeff_x=12 and last_significant_coeff_y=10.

The scan pattern 1824 may also be performed in the opposite direction shown in FIG. 18C, but along the same path, beginning with the last coefficient of the scan path 1824. This permits the position of the last significant coefficient 1822 to be determined more rapidly and by considering fewer coefficients.

The problem is that since the TU 802 can be as large as 32×32, the coding of the last_significant_coeff_x and last_significant_coeff_y variables requires a significant number of bits. To provide analogous functionality while requiring fewer bits, a two-level significance map may be adopted, which partitions TUs 802 larger than a specific size (for example, 16×16) into non-overlapping portions known as subblocks of the same size (e.g. 4×4).

Figures 18D, 18E:
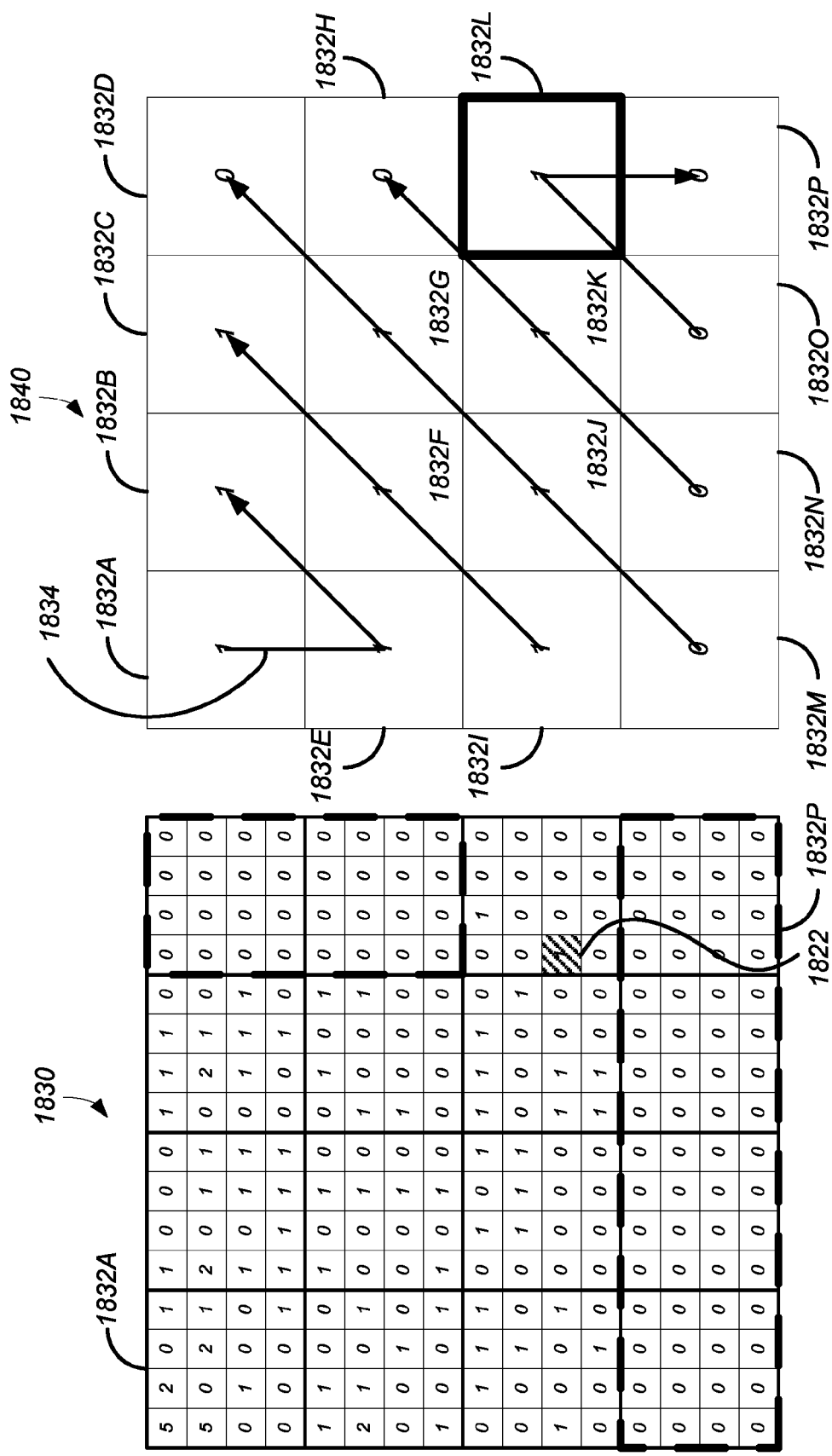
FIG. 18D is a diagram illustrating a transform unit that has been partitioned into sixteen non-overlapping subblocks.
FIG. 18E is a diagram of an L1 significance map corresponding to the partitioned transform unit of FIG. 18D.

FIG. 18D is a diagram illustrating a TU 802 that has been partitioned into sixteen non-overlapping subblocks 1822A-1822P, each subblock 1822 having the same 4×4 dimension and each including sixteen coefficients. The resulting partitioned TU 802 permits the definition of a multi-level significance map coding for the TU 802 that includes a level zero (L0) significance map and level one (L1) significance map.

The L0 significance map indicates which coefficients within a TU 802 are nonzero coefficients. If a coefficient is a non-zero coefficient, a significant_coeff_flag associated with the coefficient is set to a first value, such as "1". Otherwise, the significant_coeff_flag associated with that coefficient is set to a second value, such as "0". FIG. 18B is a diagram showing an exemplary L0 significance map 1830 for the TU 802 shown in FIG. 18A.

The L1 significance map indicates which 4×4 subblocks within a TU 802 contain at least one non-zero coefficient. If a 4×4 subblock (for example, subblock 1832A) has at least one nonzero coefficient, a significant_coeffgroup_flag associated with that subblock is set to a first value such as a "1". Otherwise, (for example, subblock 1832P) the significant_coeffgroup_flag is set to a second value such as a "0".

FIG. 18E is a diagram of an L1 significance map 1840 corresponding to the partitioned TU 802 of FIG. 18D. Note that the dashed subblocks of the TU 802 illustrated in FIG. 18D (subblocks 1832D, 1832H, and 1832M-1832P) each have all zero coefficients, and that this is reflected by the significant_coeffgroup_flag associated with the related portions of the L1 significance map 1840 having a value of "0". Note also that the remaining subblocks have at least one non-zero coefficient and thus subblocks 1832A-1832C, 1832E-1832G, and 1832I-1832L each have an associated significant_coeffgroup_flag with a value of "1".

Also note that if the subblocks 1842A-1842P were scanned using the diagonal subblock scan pattern 1832 analogous to the scan pattern of 1302A (e.g. diagonally and subblock-by-subblock) as shown in FIG. 18E, subblock 1832L is the last subblock in the subblock scan pattern of the TU 802 to have a non-zero coefficient therein. This subblock 1832L is known as the last significant subblock 1832.

The position of the last significant subblock 1832L may be computed and coded in the bitstream 314. In one embodiment, the last significant subblock 1832L position is expressed in terms of the horizontal and vertical position from the upper leftmost subblock 1832A, using variables last_significant_subblock_coeff_x and last_significant_subblock_coeff_y. In the exemplary L1 significance map and scan pattern of FIG. 18E, (last_significant_subblock_coeff_x, last_significant_subblock_coeff_y) is (3,2). Using subblocks of coefficients rather than coefficients to define the position reduces the range of the stored variables from 0-3 to 0-15 for a 16×16 TU 802, and generating a L1 significance map only up to the last significant subblock 1832L along the subblock scan pattern 1834 permits further savings.

The position of the last significant subblock 1832L can be expressed in other terms, for example, in the number of subblocks 1832 along the subblock scan path 1834 from the first subblock in the scan pattern 1832A.

Figure 19:
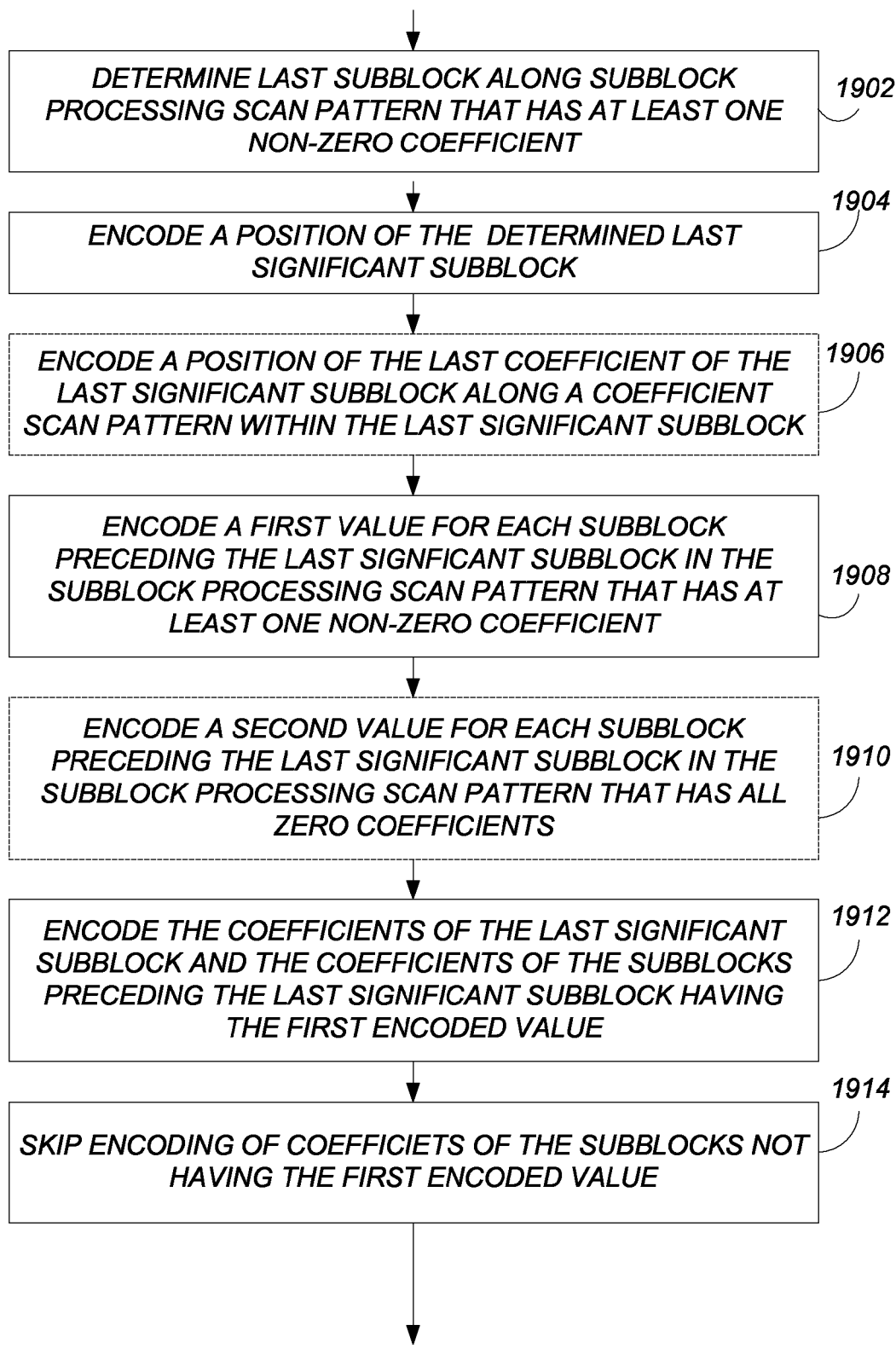
FIG. 19 is diagram presenting an exemplary technique for performing a last subblock coding technique that can be used in an HEVC encoding/decoding system.

FIG. 19 is a diagram presenting an exemplary technique for performing a last subblock coding technique that can be used in an HEVC encoding/decoding system 202. In block 1902, the last subblock 1832L along a subblock processing scan pattern 1834 that has at least one non-zero TU coefficient (e.g. the last significant subblock) is determined. In block 1904, the position of the determined last significant subblock 1832L is encoded. As described above, the position of the last significant encoded subblock 1832L may be encoded as last_significant_subblock_coeff_x and last_significant_subblock_coeff_y values, or by other syntax.

Turning next to block 1908, a first value is encoded for each subblock preceding the last significant subblock in the subblock processing pattern that has at least one non-zero coefficient. For example, in FIG. 18E, the last significant subblock 1832 is subblock 1832L, and the each of the preceding subblocks in the scan pattern 1834 (e.g. subblocks 1832A-1832O) are examined to determine which of those subblocks include a non-zero TU 802 coefficient. Subblocks having a non-zero TU 802 coefficient (e.g. subblocks 1832A-1832C, 1832E-1832G, and 1832I-1832K) are encoded with a first value (in the illustrated example, "1"). Note that the a value for the last significant subblock 1832L may also be encoded as "1" but need not be so, because that subblock, by definition, has a non-zero coefficient.

FIG. 18F is a diagram illustrating a modified L1 significance map (or subblock significance map) generated using the foregoing paradigm. Note that since subblock 1832P follows the last significant subblock 1832L in the subblock scan path 1834, it is known that this subblock 1832P has no non-zero coefficients, and there coding of a "1" or a "0" for this block can be skipped, thus saving the bits that may be used encode this information. Also, note that a first value ("1") is not coded for the last significant subblock 1832L, as the fact that it includes non-zero coefficients is already known. In alternate embodiments, a first value may be encoded for this subblock, if desired.

Block 1912 encodes the coefficients 1802 of the last significant subblock 1832L and the coefficients of the subblocks 1832 preceding the last significant subblock 1832L along the subblock scan pattern 1834 having the first encoded value ("1").

In the example shown in FIG. 18F, the coefficients of last significant subblock 1832L are encoded and the coefficients of subblocks 1832A-1832C, 1832E-1832G, and 1832I-1832K and 1832M-1832O along subblock scan path 1834 are also encoded. The encoding of subblocks 1832D, 1832H, 1832M-1832O may be skipped (as shown in block 1914) as they are known to include no non-zero coefficients (since they are not associated with the first encoded value ("1") but rather the second encoded value ("0"). The encoding of block 1832P may also be skipped because it follows the last significant subblock 1832L in the subblock scan pattern, and is therefore known not to have any non-zero coefficients.

The foregoing can be accomplished in order of the subblock scan pattern 1834 (e.g. from the first subblock in the scan pattern 1832A to the last significant subblock 1832L) or may be accomplished in reverse order (from the last significant subblock 1832L and proceeding to the first subblock 1832A in the subblock scan pattern 1834).

Figure 20:
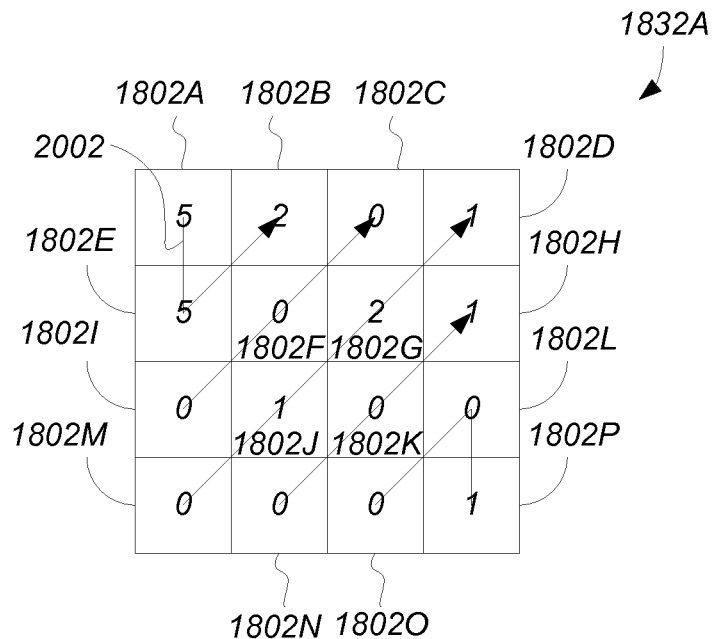
FIG. 20 presents a diagram illustrating the coefficients of a candidate subblock having the first encoded value indicating that it includes non-zero coefficients.

FIG. 20 presents a diagram illustrating the coefficients of a candidate subblock having the first encoded value indicating that it includes non-zero coefficients. One such subblock 1832 is subblock 1832A, which is illustrated in the diagram. The coefficients 1802 of each subblock are scanned and encoded following a coefficient scan pattern 2002. The coefficient scan pattern 2002 illustrated in FIG. 20 follows an analogous scan pattern to the subblock scan pattern 1834, but this not need be the case, as the coefficient scan pattern 2002 may differ from the subblock scan pattern 1834. Further, although the coefficient scan pattern 2002 illustrated in FIG. 20 is indicated as being scanned from the top-leftmost coefficient 1802A to the lower rightmost coefficient 1802P, this need not be the case, as the direction may be reversed.

The coding of the coefficients themselves may be performed as shown in FIG. 18G. In this embodiment, a significance map 1820 for the coefficients of the subblock under consideration (in the illustrated case, subblock 1832A) is generated, resulting in a corresponding portion of the significance map 1820 (illustrated as item 1820A) for the entire TU 820. The difference between the portion of the coefficients 1832A and the significance map 1820A is obtained and used as the coded coefficients 1850A. For example, the first row of the first subblock 1832A has the values (5, 2, 0, 1). These corresponding significant map 1820 (1, 1, 0, 1) values may be subtracted from the TU 820 values to produce the values (4, 1, –, 0), and these resulting values may be further coded. This allows the same information to be conveyed while using fewer bits. Note that the zero-valued coefficients of the subblock 1832A are not encoded during this process, but the non-zero coefficients are coded.

Note that the significance map 1820 for the TU 802 may be generated as a part of the encoding process. However, using the foregoing techniques, the significance map 1820 may be generated only for the last significant subblock 1832L and the subblocks that precede it in the subblock scan pattern 1834.

The aforementioned technique can be applied only to TUs 802 exceeding a particular size or dimension, for example, 16×16, 16×4, 4×16, 32×32, 32×8 and 8×32. For a generalized M×N TU 802, coding the last significant subblock position using the two-level significance map instead of the last significant coefficient position:
1. Reduces the range of the last significant position: If a 16×16 TU 802 is divided into 4×4 subblocks, the range of the last coded position is reduced from 0-15 for the last significant coefficient values to 0-3 for 16×N or N×16 TU 802 for the last significant subblock values. Similarly, the range of the last coded position is reduced from 0-31 to 0-7 for 32×N or N×32 TUs 802, where N is equal to, or smaller less than, the other dimension size.
2. Reduces the context table size for coding the syntax of the last coded position: Instead of 6 luma contexts for 16×16 and 7 luma contexts for 32×32 of each type (I, P, B), only half size of contexts, or even smaller than half size of contexts, are now needed for coding of the last subblock position. Also, it is possible that the contexts for 4×4 and 8×8 TU 802 may be used to code the last coded subblock position of 16×16 and 32×32 TUs 802. In this case, the 16×16 and 32×32 contexts can be completely removed. Finally, for an M×N TU 802 where M≠N and max(M,N) is larger or equal to 16, the same benefits in context reduction can also be possible.

Returning to FIG. 19, dashed blocks 1906, and 1910 indicate operations that may be optionally performed in addition to those already discussed. For example, in the foregoing embodiment, a first value "1" was encoded for each subblock 1832 preceding the last significant subblock 1832L in the scan pattern 1834 having a non-zero coefficient. Any subblock without an encoded first value is therefore known to not include coefficients with non-zero values, and it is therefore unnecessary to code information describing this fact. However, in one embodiment, a second value (such as a "0") can be encoded for each subblock 1832 preceding the last significant subblock 1832L) having no non-zero coefficients (or all zero coefficients). In this embodiment, the coefficients of subblocks having the second value may be skipped.

FIG. 19 also refers to another optional embodiment in which the position of the last non-zero coefficient 1822 of the last significant subblock 1832L is also encoded, as shown in block 1906.

While coding according to the last significant subblock rather than the last significant coefficient saves a number of bits, it also can result in a number of bits trailing the last significant coefficient having a zero value to be coded. For example, in FIG. 18E, the last significant subblock is subblock 1832L. If all of the coefficients in this subblock 1832L are coded (and subsequently decoded), a number of trailing coefficients (e.g. the zero coefficients following the last non-zero coefficient 1822) will be unnecessarily encoded and decoded.

Figure 21:
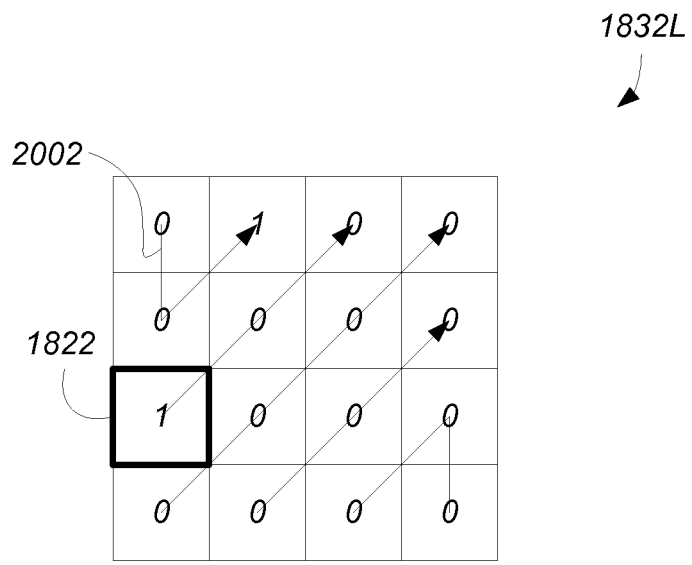
FIG. 21 is a diagram of the last significant subblock of the transform unit.

FIG. 21 is a diagram of the last significant subblock 1832L of the TU 802. Coefficient 1822 is the last significant coefficient on the coefficient scan pattern 2002 of the last significant subblock 1832L, and hence, the coefficients that follow this coefficient 1822 in the coefficient scan pattern are all zeros and need not be coded. Consequently, the encoding of these coefficients can be skipped to save processing and bits. This can be implemented by determining the last significant coefficient 1822 of the last significant subblock 1832L as the last coefficient along a coefficient scan pattern 2002 within the last subblock 1832L having a non-zero value, the encoding a position of the determined last significant coefficient of the last significant subblock. In one embodiment, the last significant subblock coefficient value can be expressed in coefficient unit displacements away from the upper leftmost coefficient of the last significant subblock 1832L. In the example illustrated in FIG. 21, for example, the last significant subblock coefficient position can be described as last_significant_subblock_last_significant_coeff_x=0 and last_significant_subblock_last_significant_coeff_y=1.

Encoding of the TU 802 coefficients of this last significant subblock 1832L can cease so that the encoding of trailing zero coefficients are skipped.

Returning to FIG. 19 the process of determining the last subblock along a subblock processing pattern that has at least one non-zero coefficient can be accomplished in a number of ways. In one embodiment, this is accomplished using the last_significant_coeff_x and last significant coeff_y values available from previous operations in the encoder 312. These last_significant_coeff_x and last significant coeff_y values can be used to calculate the last significant subblock 1832L position. For example, the last significant coefficient 1822 position of the TU 802 can be associated with the last significant subblock 1832L in Cartesian coordinates by dividing the coordinate of the last significant coefficient 1822 by the associated subblock dimension for each coordinate direction and disregarding the remainder. In the example shown in FIG. 18D, for example, the last significant coefficient values are (12,10) and the subblock dimensions are 4×4. In this case, the last significant subblock can be determined as (int[12/4], int[10/4])=(3,2), wherein the int[*] function returns the integer resulting from the operation. If the last significant subblock is defined in other ways (e.g. the number of subblocks from the first subblock in the subblock scan pattern), the last subblock may still be mapped from the last significant coefficient position, but more a more complex algorithm may be required.

If the last_significant_coeff_x and last significant coeff_y values are unavailable to map into the position of the last significant subblock position, they may be determined simply by scanning the coefficients using the array scan pattern 1824 or the same subblock scan pattern 1834 and coefficient scan pattern 2002 that will be used in the decoder until the last non-zero coefficient is found. This may be advantageously performed beginning at the last coefficient of the TU 802 in the scan pattern 1824 and scanning until a non-zero coefficient is found, or by beginning at the first coefficient of the TU 802 and scanning the entire TU 802.

The technique described above can be practiced in other embodiments. For example, instead of determining the last significant subblock and only coding a first value for those subblocks preceding the last significant subblock, the technique may be practiced by scanning the coefficients of the TU 802 and coding a first value for all subblocks having non-zero values (and optionally coding a second value for all subblocks having only zero values), and designating the last significant subblock as the last subblock in the subblock scan pattern that has a coded first value. This technique is useful where a complete L1 level significance map is already available, as the last significant subblock can be readily ascertained from a complete L1 significance map.

Figure 22:
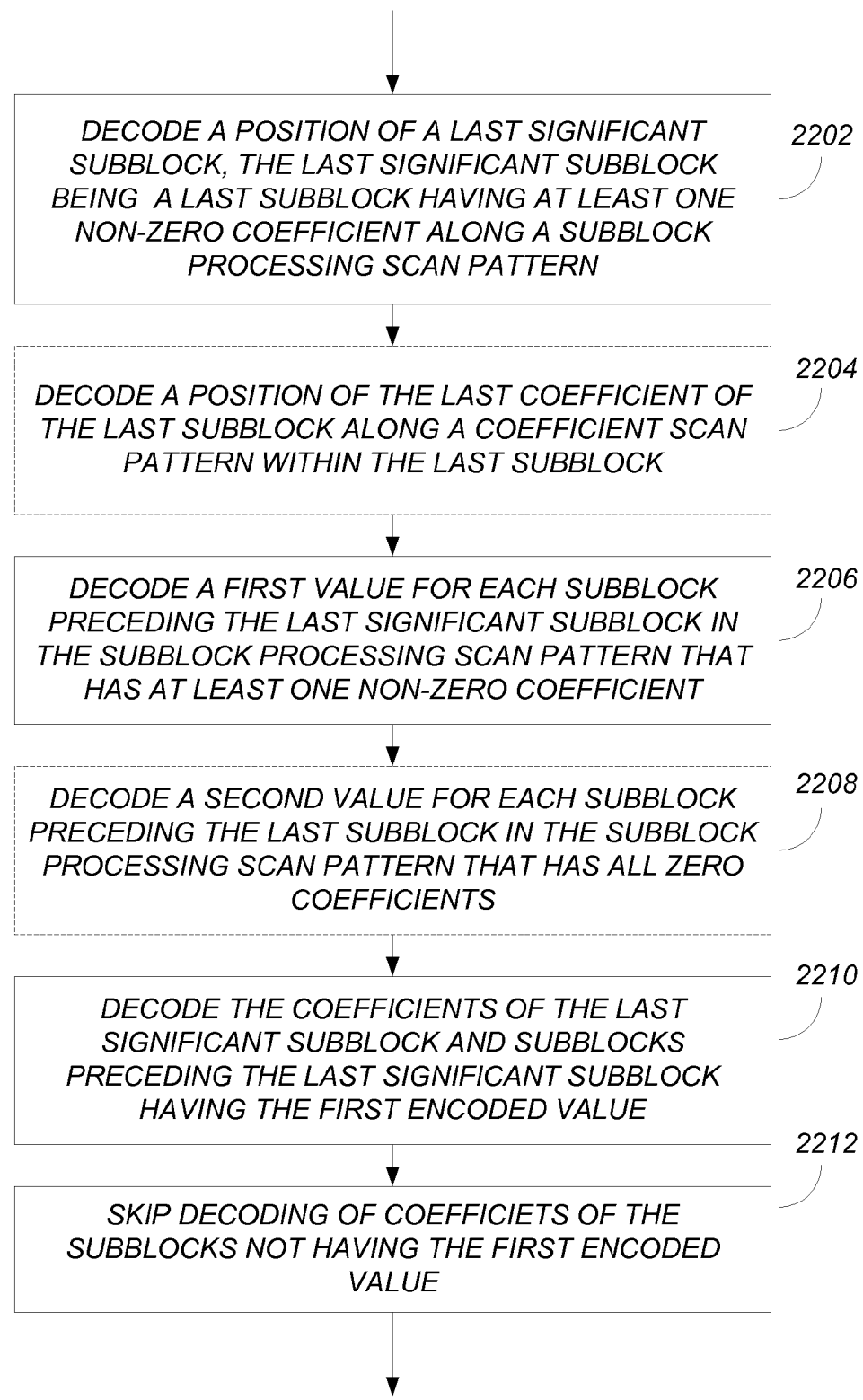
FIG. 22 is a diagram illustrating an exemplary technique for decoding transform unit coefficients that were encoded using the foregoing last coefficient group position technique.

FIG. 22 is a diagram illustrating an exemplary technique for decoding TU 802 coefficients that were encoded using the foregoing last coefficient group position technique described above. As described above, the encoding process creates a bitstream 314 that includes syntax for the last significant subblock (e.g. last_significant_subblock_coeff_x and last_significant_subblock_coeff_y). Block 2202 decodes a position of the last significant subblock 1832L, which is the last subblock having at least one non-zero coefficient along the subblock processing scan pattern 1834. Depending on how the last significant subblock is encoded, (e.g. as last_significant_subblock_coeff_x and last_significant_subblock_coeff_y, the number of subblocks from the first subblock in the scan pattern, or using a row or column index as described above) this may require computing the last significant subblock position using the information passed in the syntax to account for different scan patterns.

Block 2206 decodes a first value ("1" for example) for each subblock 1832 preceding the last subblock 1832L along the subblock processing scan pattern that has at least one non-zero coefficient. This can be accomplished, for example, by looping through all of the subblocks 1832 preceding the last subblock 1832L and decoding the significant_coeff_group flag associated each of the subblocks. This identifies all subblocks 1832 preceding the last significant subblock 1832L having non-zero coefficients. This can be performed along the subblock scan pattern beginning at the last significant subblock 1832L and ending at the first subblock 1832A in the scan pattern, or from the first subblock 1832A in the scan pattern and ending at the last significant subblock 1832L.

The coefficients of the last significant subblock 1832L and the subblocks having the first encoded value (e.g. "1") are then decoded, as shown in block 2210. Again, this can follow the subblock scan pattern 1834 in either direction, and the scanning of the coefficients within each subblock 1832 can be performed in the coefficient scan pattern 2002, in either direction. As shown in block 2212, the decoding of the coefficients within subblocks 1832 not having the significant_coeff_group flag with the first value may skipped, because it is known that the coefficients in these subblocks all have zero values. Further, the decoding of coefficients within subblocks that follow the last significant subblock 1832L in the subblock scan pattern 1834 (e.g. subblock 1832P need not be performed, as it is known that such subblocks do not include non-zero coefficients.

As described earlier, it can be inferred that any subblock 1832 not having an associated significant_coeff_group flag of the first value ("1") may be assumed to have all zero coefficients. However in the embodiment described in FIG. 19, block 1910 encoded a second value for each subblock preceding the last subblock in the subblock processing scan pattern that had all zero coefficients. Hence, the status of such subblocks 1832 is expressly described by the significant_coeff_group flag having a second value ("0"). In this case, the decoding of the coefficients of any subblock 1832 having an associated significant_coeff_group flag having the second value is skipped, so that only those subblocks 1832 associated with the significant_coeff_group flag having the first value will have their coefficients decoded. This is shown in block 2208 of FIG. 22.

Also as described in block 1906 of FIG. 19, the position of the last significant coefficient within the last significant subblock 1832L may be encoded using the last_significant_subblock_last_significant_coeff_x and last_significant_subblock_last_significant_coeff_y variables. If such information is encoded into the bitstream 314, block 2204 decodes the information so that the position of the last significant coefficient of the last significant subblock is known. The decoding of the coefficients of the last significant subblock 1832L can begin at this position (e.g. coefficient 1822) and proceed along the coefficient scan path 2002 in a reverse direction to the first coefficient of the last significant subblock 1832L or may begin at the first coefficient and end at the last significant coefficient 1822. Note that this is an improvement from coding and decoding the last significant coefficient of the entire TU 802 array, since the values describing last significant coefficient within a 4×4 subblock will only need to code values between 0-3 rather than 0-16 or 0-32.

While the foregoing has been discussed with respect to the setting of flags, indexes, or other designators to a particular value or state for purposes of passing information or process signaling, the use of the term flag and index is intended to broadly encompass the setting of any designator or other memory artifice for the purpose or reading that designator or memory artifice for later use as described herein.

Hardware Environment

Figure 23:
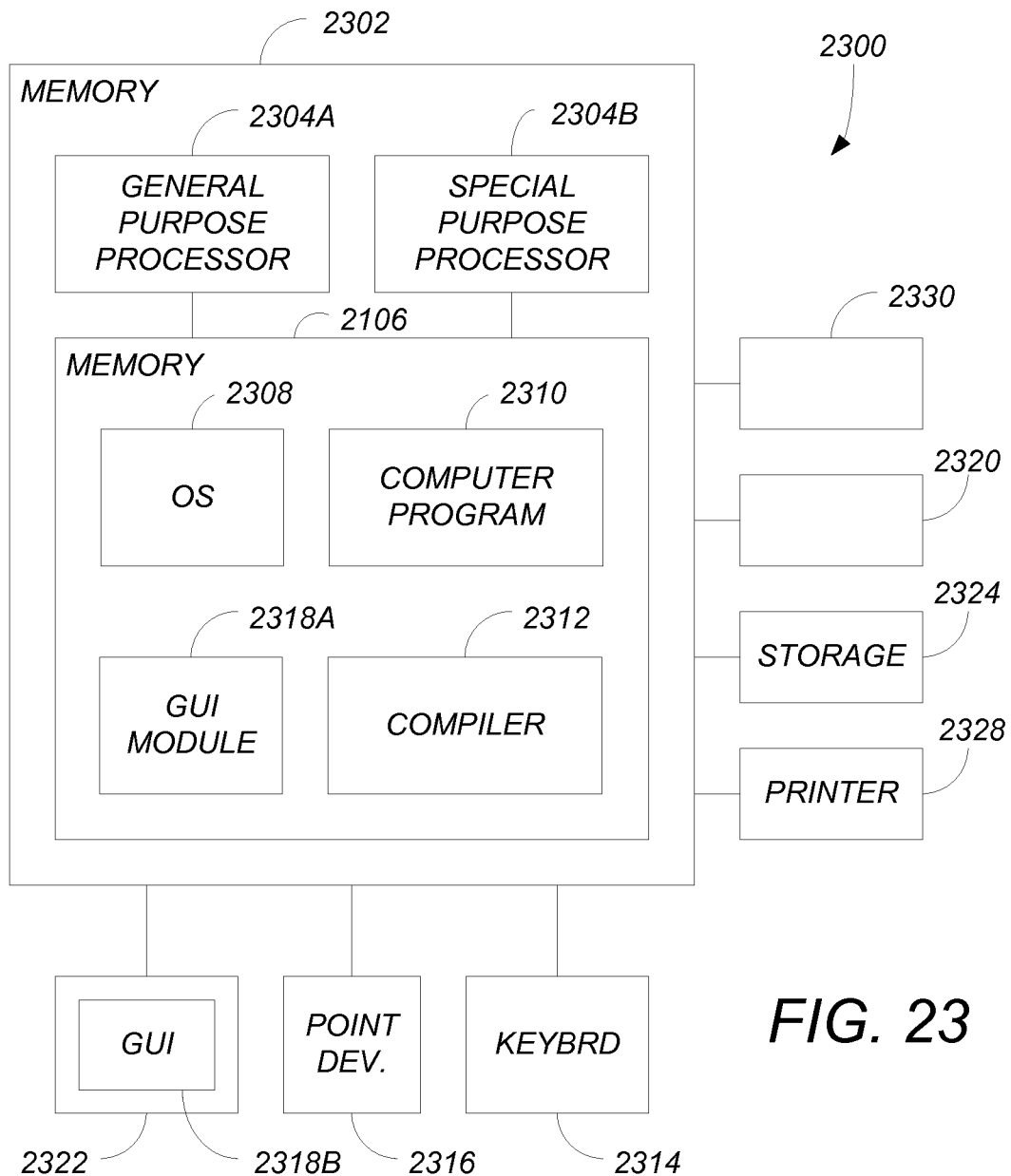
FIG. 23 illustrates an exemplary processing system that can be used to implement the embodiments of the invention.

FIG. 23 illustrates an exemplary processing system 2300 that could be used to implement the embodiments of the invention. The computer 2302 comprises a processor 2304 and a memory, such as random access memory (RAM) 2306. The computer 2302 is operatively coupled to a display 2322, which presents images such as windows to the user on a graphical user interface 2318B. The computer 2302 may be coupled to other devices, such as a keyboard 2314, a mouse device 2316, a printer, etc. Of course, those skilled in the art will recognize that any combination of the above components, or any number of different components, peripherals, and other devices, may be used with the computer 2302.

Generally, the computer 2302 operates under control of an operating system 2308 stored in the memory 2306, and interfaces with the user to accept inputs and commands and to present results through a graphical user interface (GUI) module 2318A. Although the GUI module 2318A is depicted as a separate module, the instructions performing the GUI functions can be resident or distributed in the operating system 2308, the computer program 2310, or implemented with special purpose memory and processors. The computer 2302 also implements a compiler 2312 which allows an application program 2310 written in a programming language such as COBOL, C++, FORTRAN, or other language to be translated into processor 2304 readable code. After completion, the application 2310 accesses and manipulates data stored in the memory 2306 of the computer 2302 using the relationships and logic that was generated using the compiler 2312. The computer 2302 also optionally comprises an external communication device such as a modem, satellite link, Ethernet card, or other device for communicating with other computers.

In one embodiment, instructions implementing the operating system 2308, the computer program 2310, and the compiler 2312 are tangibly embodied in a computer-readable medium, e.g., data storage device 2320, which could include one or more fixed or removable data storage devices, such as a zip drive, floppy disc drive 2324, hard drive, CD-ROM drive, tape drive, etc. Further, the operating system 2308 and the computer program 2310 are comprised of instructions which, when read and executed by the computer 2302, cause the computer 2302 to perform the steps necessary to implement and/or use the invention. Computer program 2310 and/or operating instructions may also be tangibly embodied in memory 2306 and/or data communications devices 2330, thereby making a computer program product or article of manufacture. As such, the terms "article of manufacture," "program storage device" and "computer program product" as used herein are intended to encompass a computer program accessible from any computer readable device or media.

The processing system 2300 may also be embodied in a desktop, laptop, tablet, notebook computer, personal data assistant (PDA), cellphone, smartphone, or any device with suitable processing and memory capability. Further, the processing system 2300 may utilize special purpose hardware to perform some or all of the foregoing functionality. For example the encoding and decoding processes described above may be performed by a special purpose processor and associated memory.

Those skilled in the art will recognize many modifications may be made to this configuration without departing from the scope of the present disclosure. For example, those skilled in the art will recognize that any combination of the above components, or any number of different components, peripherals, and other devices, may be used. For example, particular functions described herein can be performed by hardware modules, or a processor executing instructions stored in the form of software or firmware. Further, the functionality described herein can be combined in single modules or expanded to be performed in multiple modules.

CONCLUSION

The foregoing description of the preferred embodiment has been presented for the purposes of illustration and description. It is not intended to be exhaustive or to limit the disclosure to the precise form disclosed. Many modifications and variations are possible in light of the above teaching. It is intended that the scope of rights be limited not by this detailed description, but rather by the claims appended hereto.

What is claimed is:

1. A method of processing a transform unit having an array of coefficients, comprising:
   (a) determining if all of the coefficients of a portion of the transform unit disposed on a portion of a scan pattern are zero;
   (b) setting a flag associated with the portion of the transform unit to a first value if at least one of the coefficients of the portion of the transform unit coefficients disposed on the portion of the scan pattern are non-zero by determining if all of the coefficients of the further portions of the transform unit coefficients disposed on the scan pattern are zero, setting no further flags if all of the coefficients of the further portions of the transform unit coefficients are zero, and setting the further flag only if at least one of the coefficients of the remaining portions of the transform unit coefficients disposed on the remaining portion of the scan pattern is non-zero;
   (c) setting the flag associated with the portion of the transform unit coefficients to a second value if all of the coefficients of the portion of the transform unit coefficients disposed in the portion of the scan pattern are zero;
   (d) repeating steps (a)-(c) to set a further flag associated with each further portion of the transform unit coefficients disposed on each further portion of the scan pattern; and
   (e) encoding the flags and at least a portion of the transform unit coefficients into a coded bitstream.

2. The method of claim 1, wherein encoding the flags the portion of the transform unit coefficients into the coded bitstream includes encoding only those coefficients associated with a flag having the first value, and skipping encoding of those coefficients associated with a flag having the second value.

3. The method of claim 1, wherein the array is an N×M array comprising rows and columns and the scan pattern is a wavefront scan pattern that includes a plurality of diagonal scans in a diagonal direction, and each portion of the scan pattern comprises all of the coefficients in one diagonal of the plurality of diagonal scans of the wavefront scan pattern.

4. A method of processing a transform unit having an array of coefficients, comprising:
   (a) determining if all of the coefficients of a portion of the transform unit disposed on a portion of a scan pattern are zero, wherein the scan pattern is in a row direction, and each portion of the scan pattern comprises a row of a plurality of rows of coefficients;
   (b) setting a flag associated with the portion of the transform unit to a first value if at least one of the coefficients of the portion of the transform unit coefficients disposed on the portion of the scan pattern are non-zero;
   (c) setting the flag associated with the portion of the transform unit coefficients to a second value if all of the coefficients of the portion of the transform unit coefficients disposed in the portion of the scan pattern are zero; and
   (d) encoding the flags and at least a portion of the transform unit coefficients into a coded bitstream.

5. A method of processing a transform unit having an array of coefficients, comprising:
   (a) determining if all of the coefficients of a portion of the transform unit disposed on a portion of a scan pattern are zero, wherein the scan pattern is in a column direction, and each portion of the scan pattern comprises a column of a plurality of columns of coefficients;
   (b) setting a flag associated with the portion of the transform unit to a first value if at least one of the coefficients of the portion of the transform unit coefficients disposed on the portion of the scan pattern are non-zero; and
   (c) setting the flag associated with the portion of the transform unit coefficients to a second value if all of the coefficients of the portion of the transform unit coefficients disposed in the portion of the scan pattern are zero.

6. A method of processing a transform unit having an array of coefficients, comprising:
   (a) reading a flag associated with all of the coefficients of a first portion of the transform unit coefficients disposed on a first portion of a scan pattern, wherein each flag is a member of a last coefficient flag set associated with the transform unit;
   (b) decoding the first portion of the transform unit coefficients disposed on the first portion of the scan pattern if the flag has a first value; and
   (c) skipping coding of the first portion of the transform unit coefficients disposed on the first portion of the scan pattern only if the flag has a second value, by determining if the flag is a last read flag of the last coefficient flag set and the last read flag has the second value, decoding the portion of the transform unit coefficients following the portion of the transform unit coefficients associated with the last read flag and skipping decoding of the portions of further transform unit coefficients; and
   (d) performing steps (a)-(c) for each remaining flag associated with each remaining portion of the transform unit coefficients of each remaining portion of the scan pattern.

7. The method of claim 6, wherein the array is an n×m array comprising rows and columns and the scan pattern is a wavefront scan pattern in a diagonal direction.

8. The method of claim 6, wherein the array comprises a plurality of rows of coefficients, and the scan pattern is in a row direction.

9. The method of claim 6, wherein the array comprises a plurality of columns of coefficients, and the scan pattern is in a column direction.

10. A method of processing a transform unit having an array of coefficients, comprising:
    setting a plurality of flags, each flag associated with a portion of the transform unit coefficients disposed on a portion of a scan pattern, each flag set to a first value if at least one of the coefficients in the associated portion of the transform unit disposed on the associated portion of the scan pattern is non-zero, and each flag set to a second value if all of the coefficients in the associated portion of the transform unit disposed on the associated portion of the scan pattern are zero, wherein the transform unit coefficients include a last non-zero coefficient disposed in a last non-zero coefficient portion of the scan pattern, the plurality of flags together comprise a flag set, and the flag set excludes flags associated with the portions of the scan pattern following the last non-zero coefficient portion of the scan pattern;
    coding the flag set and the portions of the transform unit coefficients having an associated flag having the first value; and
    skipping coding of the portions of the transform unit coefficients having an associated flag having the second value.

11. The method of claim 10, wherein:
    the flag set further excludes the flag associated with the last non-zero coefficient portion of the scan pattern.

12. A method of processing a transform unit having an array of coefficients, comprising:
    reading a plurality of flags, each flag associated with a portion of the transform unit coefficients disposed on a portion of a scan pattern, each flag set to a first value if at least one of the coefficients in the associated portion of the transform unit disposed on the associated portion of the scan pattern is non-zero, and each flag set to a second value if all of the coefficients in the associated portion of the transform unit disposed on the associated portion of the scan pattern are zero, the transform unit coefficients include a last non-zero coefficient disposed in a last non-zero coefficient portion of the scan pattern, the plurality of flags together comprise a flag set, and the flag set excludes flags associated with the portions of the scan pattern following the last non-zero coefficient portion of the scan pattern;
    decoding the coefficients of the portions of the transform unit having an associated flag set to the first value; and
    skipping decoding the coefficients of the portions of the transform unit having an associated flag set to the second value.

13. The method of claim 12, wherein:
    the flag set further excludes the flag associated with the last non-zero coefficient portion of the scan pattern.

14. A system for processing a transform unit having an array of coefficients, comprising:
    a processor; and
    a memory, communicatively coupled to the processor, the memory storing a plurality of instructions comprising instructions for:
    (a) determining if all of the coefficients of a portion of the transform unit disposed on a portion of a scan pattern are zero;
    (b) setting a flag from a last coefficient flag set associated with the portion of the transform unit to a first value if at least one of the coefficients of the portion of the transform unit coefficients disposed on the portion of the scan pattern are non-zero by determining if all of the coefficients of the further portions of the transform unit coefficients disposed on the scan pattern are zero, setting no further flags of the last coefficient flag set if all of the coefficients of the further portions of the transform unit coefficients are zero, and setting the further flag only if at least one of the coefficients of the remaining portions of the transform unit coefficients disposed on the remaining portion of the scan pattern is non-zero;
    (c) setting the flag associated with the portion of the transform unit coefficients to a second value if all of the coefficients of the portion of the transform unit coefficients disposed in the portion of the scan pattern are zero;
    (d) repeating steps (a)-(c) to set a further flag associated with each remaining portion of the transform unit coefficients disposed on each remaining portion of the scan pattern; and
    (e) encoding the flags and at least a portion of the transform unit coefficients into a coded bitstream.

15. The system of claim 14 wherein encoding the flags and the portion of the transform unit coefficients into the coded bitstream includes encoding only those coefficients associated with a flag having the first value, and skipping encoding of those coefficients associated with a flag having the second value.

16. A system for processing a transform unit having an array of coefficients, comprising:
    a processor; and
    a memory, communicatively coupled to the processor, the memory storing a plurality of instructions comprising instructions for:
    (a) determining if all of the coefficients of a portion of the transform unit disposed on a portion of a scan pattern are zero, wherein the scan pattern is in a row direction, and each portion of the scan pattern comprises a row of a plurality of rows of coefficients;

(b) setting a flag associated with the portion of the transform unit to a first value if at least one of the coefficients of the portion of the transform unit coefficients disposed on the portion of the scan pattern are non-zero;

(c) setting the flag associated with the portion of the transform unit coefficients to a second value if all of the coefficients of the portion of the transform unit coefficients disposed in the portion of the scan pattern are zero; and (d) encoding the flags and at least a portion of the transform unit coefficients into a coded bitstream.

17. A system for processing a transform unit having an array of coefficients, comprising:
a processor; and
a memory, communicatively coupled to the processor, the memory storing a plurality of instructions comprising instructions for:
(a) determining if all of the coefficients of a portion of the transform unit disposed on a portion of a scan pattern are zero, wherein the scan pattern is in a column direction, and each portion of the scan pattern comprises a column of a plurality of columns of coefficients;
(b) setting a flag associated with the portion of the transform unit to a first value if at least one of the coefficients of the portion of the transform unit coefficients disposed on the portion of the scan pattern are non-zero;
(c) setting the flag associated with the portion of the transform unit coefficients to a second value if all of the coefficients of the portion of the transform unit coefficients disposed in the portion of the scan pattern are zero; and
(d) encoding the flags and at least a portion of the transform unit coefficients into a coded bitstream.

18. A system for processing a transform unit having an array of coefficients, comprising:
a processor; and
a memory, communicatively coupled to the processor, the memory storing a plurality of instructions comprising instructions for:
(a) determining if all of the coefficients of a portion of the transform unit disposed on a portion of a scan pattern are zero, wherein the array is an N×M array comprising rows and columns and the scan pattern is a wavefront scan pattern that includes a plurality of diagonal scans in a diagonal direction, and each portion of the scan pattern comprises all of the coefficients in one diagonal of the plurality of diagonal scans of the wavefront scan pattern;
(b) setting a flag associated with the portion of the transform unit to a first value if at least one of the coefficients of the portion of the transform unit coefficients disposed on the portion of the scan pattern are non-zero;
(c) setting the flag associated with the portion of the transform unit coefficients to a second value if all of the coefficients of the portion of the transform unit coefficients disposed in the portion of the scan pattern are zero; and
(d) encoding the flags and at least a portion of the transform unit coefficients into a coded bitstream.

19. A system for processing a transform unit having an array of coefficients, comprising:
a processor; and
a memory, communicatively coupled to the processor, the memory storing a plurality of instructions comprising instructions for:
(a) reading a flag associated with all of the coefficients of a first portion of the transform unit coefficients disposed on a first portion of a scan pattern, wherein each flag is a member of a last coefficient flag set associated with the transform unit;
(b) decoding the first portion of the transform unit coefficients disposed on the first portion of the scan pattern only if the flag has a first value; and
(c) skipping coding of the first portion of the transform unit coefficients disposed on the first portion of the scan pattern if the flag has a second value by determining if the read remaining flag is a last read flag of the last coefficient flag set and the last read flag has the second value, decoding the portion of the transform unit coefficients following the portion of the transform unit coefficients associated with the last read flag, and skipping decoding of the portions of further transform unit coefficients; and
(d) performing steps (a)-(c) for each remaining flag associated with each remaining portion of the transform unit coefficients of each remaining portion of the scan pattern.

20. The system of claim 19, wherein the array is an n×m array comprising rows and columns and the scan pattern is a wavefront scan pattern in a diagonal direction.

21. The system of claim 19, wherein the array comprises a plurality of rows of coefficients, and the scan pattern is in a row direction.

22. The system of claim 19, wherein the array comprises a plurality of columns of coefficients, and the scan pattern is in a column direction.

23. A system of processing a transform unit having an array of coefficients, comprising:
a processor; and
a memory, communicatively coupled to the processor, the memory storing a plurality of instructions comprising instructions for:
setting a plurality of flags, each flag associated with a portion of the transform unit coefficients disposed on a portion of a scan pattern, each flag set to a first value if at least one of the coefficients in the associated portion of the transform unit disposed on the associated portion of the scan pattern is non-zero, and each flag set to a second value if all of the coefficients in the associated portion of the transform unit disposed on the associated portion of the scan pattern are zero, wherein the transform unit coefficients include a last non-zero coefficient disposed in a last non-zero coefficient portion of the scan pattern, the plurality of flags together comprise a flag set, and the flag set excludes flags associated with the portions of the scan pattern following the last non-zero coefficient portion of the scan pattern;
coding the portions of the transform unit coefficients having an associated flag having a the first value;
skipping coding of the portions of the transform unit coefficients having an associated flag having the second value; and
encoding the flag set and at least a portion of the transform unit coefficients into a coded bitstream.

24. The system of claim 23, wherein:
the flag set further excludes the flag associated with the last non-zero coefficient portion of the scan pattern.

25. A system for processing a transform unit having an array of coefficients, comprising:
a processor; and
a memory, communicatively coupled to the processor, the memory storing a plurality of instructions comprising instructions for:
reading a plurality of flags, each flag associated with a portion of the transform unit coefficients disposed on a portion of a scan pattern, each flag set to a first value if at least one of the coefficients in the associated portion of the transform unit disposed on the associated portion of the scan pattern is non-zero, and each flag set to a second value if all of the coefficients in the associated portion of the transform unit disposed on the associated portion of the scan pattern are zero, wherein the transform unit coefficients include a last non-zero coefficient disposed in a last non-zero coefficient portion of the scan pattern, the plurality of flags together comprise a flag set, and the flag set excludes flags associated with the portions of the scan pattern following the last non-zero coefficient portion of the scan pattern;
decoding the coefficients of the portions of the transform unit having an associated flag set to the first value; and
skipping decoding the coefficients of the portions of the transform unit having an associated flag set to the second value.

26. The system of claim 25, wherein:
the flag set further excludes the flag associated with the last non-zero coefficient portion of the scan pattern.

* * * * *